(12) United States Patent
Okamoto et al.

(10) Patent No.: US 9,954,232 B2
(45) Date of Patent: Apr. 24, 2018

(54) FUEL CELL

(71) Applicant: NGK Insulators, Ltd., Nagoya (JP)

(72) Inventors: Taku Okamoto, Nagoya (JP); Makoto Ohmori, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 361 days.

(21) Appl. No.: 13/875,482

(22) Filed: May 2, 2013

(65) Prior Publication Data

US 2014/0134514 A1 May 15, 2014

Related U.S. Application Data

(60) Provisional application No. 61/658,637, filed on Jun. 12, 2012.

(30) Foreign Application Priority Data

Jun. 8, 2012 (JP) .................... 2012-131077

(51) Int. Cl.
*H01M 8/02* (2016.01)
*H01M 8/0247* (2016.01)
*H01M 8/1226* (2016.01)
*H01M 8/2432* (2016.01)
*H01M 8/2428* (2016.01)
*H01M 8/124* (2016.01)

(52) U.S. Cl.
CPC ....... *H01M 8/0247* (2013.01); *H01M 8/1226* (2013.01); *H01M 8/2428* (2016.02); *H01M 8/2432* (2016.02); *H01M 2008/1293* (2013.01)

(58) Field of Classification Search
CPC . H01M 8/0247; H01M 8/1226; H01M 8/2432
USPC .................................. 429/457, 479
See application file for complete search history.

(56) References Cited

U.S. PATENT DOCUMENTS

| | | | |
|---|---|---|---|
| 6,261,711 B1* | 7/2001 | Matlock ............. | H01M 8/0247 429/513 |
| 7,285,348 B2* | 10/2007 | Yamashita et al. ........... | 429/456 |
| 8,703,352 B2* | 4/2014 | Ohmori et al. ................ | 429/463 |
| 9,005,844 B2* | 4/2015 | Ohmori et al. ................ | 429/495 |
| 9,083,011 B2* | 7/2015 | Ohmori et al. | |

(Continued)

FOREIGN PATENT DOCUMENTS

| | | | | |
|---|---|---|---|---|
| JP | 08-106916 A1 | 4/1996 | | |
| JP | 2005-174722 | * | 6/2005 | ............. H01M 8/12 |
| JP | 2008-226789 A1 | 9/2008 | | |

*Primary Examiner* — Osei K Amponsah
(74) *Attorney, Agent, or Firm* — Burr & Brown, PLLC

(57) ABSTRACT

Provided is a fuel cell as a fired body including a porous plate-like support substrate having a gas flow path formed therein, and a power generation element part provided on a principal surface of the support substrate, the power generation element part including at least a fuel electrode, a solid electrolyte, and an air electrode laminated in this order. The generation of cracks in the support substrate has a strong correlation with a "surface roughness of a wall surface of a gas flow" of the fuel cell in a state of a reductant. When the surface roughness of the wall surface of the gas flow path is 0.16 to 5.2 in terms of an arithmetic average roughness Ra in a state in which the fuel cell is a reductant that has been subjected to heat treatment in a reducing atmosphere, the generation of the cracks can be suppressed.

8 Claims, 21 Drawing Sheets

(56) References Cited

U.S. PATENT DOCUMENTS

| | | | |
|---|---|---|---|
| 2004/0058228 A1* | 3/2004 | Shibata | H01M 4/861 429/480 |
| 2004/0157112 A1* | 8/2004 | Suzuki et al. | 429/44 |
| 2005/0130022 A1* | 6/2005 | Tanno et al. | 429/38 |
| 2006/0147778 A1* | 7/2006 | Matsuzaki et al. | 429/32 |
| 2008/0057356 A1* | 3/2008 | Shimomura | H01M 4/8605 429/495 |

* cited by examiner

FUEL CELL

BACKGROUND OF THE INVENTION

1. Field of the Invention

The present invention relates to a fuel cell.

2. Description of the Related Art

Hitherto, there has been widely known a fuel cell which is a fired body including a porous plate-like support substrate having gas flow paths formed therein, and a power generation element part which is provided on a principal surface of the support substrate and in which at least a fuel electrode, a solid electrolyte, and an air electrode are laminated in this order (see, for example, Japanese Patent Application Laid-Open Nos. Hei 8-106916 and 2008-226789).

The above-mentioned fuel cell is produced, for example, in the following procedure. First, a compact (green film) of the fuel electrode and a compact of the solid electrolyte are laminated successively on a principal surface of a compact of the support substrate. The laminated compacts are co-fired in the atmosphere. A compact of the air electrode is laminated on a surface of the solid electrolyte in the laminated fired body. The compact of the air electrode is fired in the atmosphere, and thus the fuel cell is produced as a fired body. After that, in order to acquire conductivity of the support substrate, the fuel electrode, and the like, before the fuel cell is operated, the fuel cell as a fired body is subjected to heat treatment (hereinafter referred to as "reducing treatment") involving supplying reducing gas at a high temperature (for example, about 800° C.) to the fuel cell, and thus the fuel cell is shifted from a non-reductant to a reductant.

SUMMARY OF THE INVENTION

During the above-mentioned reducing treatment, cracks are generated across a wall surface of the gas flow path to the principal surface in the support substrate in some cases (see FIGS. 2 and 17 described later). The inventors of the present invention conducted various experiments so as to solve the problem. Consequently, the inventors of the present invention found that there is a strong correlation between the generation of the cracks and the "surface roughness of the wall surface of the gas flow path."

It is an object of the present invention to provide a fuel cell which is a fired body including a porous support substrate having gas flow paths formed therein, and is capable of preventing cracks from being generated in the support substrate during reducing treatment after firing.

According to an exemplary embodiment of the present invention, there is provided a fuel cell as a fired body, including: a porous plate-like support substrate having a plurality of gas flow paths formed therein; and a power generation element part provided on a surface of the support substrate, the power generation element part including at least a fuel electrode, a solid electrolyte, and an air electrode laminated in the stated order. In the fuel cell, the support substrate has a longitudinal direction, and the plurality of gas flow paths are formed parallel to each other at intervals in a width direction along the longitudinal direction in the support substrate. An outer periphery of the support substrate is covered with a dense film of the solid electrolyte. The fuel cell has a feature that, in a state in which the fuel cell is a reductant that has been subjected to heat treatment in a reducing atmosphere, a surface roughness of a surface formed of a material for the support substrate in an inner wall portion of each of the plurality of gas flow paths is 0.16 µm to 5.2 µm in terms of an arithmetic average roughness Ra.

In this case, it is preferred that the support substrate has a porosity of 20% to 60%. Further, in the case where the support substrate is a plate-like substrate, the support substrate has the longitudinal direction. In the support substrate, the plurality of gas flow paths are formed parallel to each other in the longitudinal direction at intervals in the width direction, and an aspect ratio which is a ratio of a width of the support substrate with respect to a thickness of the support substrate may be 5 or more. The thickness of the support substrate is 1 mm to 5 mm, and a sectional shape of each of the gas flow paths may be a circle having a diameter of 0.5 mm to 3 mm. Further, the support substrate may contain one of a nickel oxide (NiO) and nickel (Ni), and an insulating ceramics.

In general, in a solid oxide fuel cell (hereinafter referred to as "SOFC"), in order to acquire conductivity of the fuel electrode, before the SOFC is operated, it is necessary to subject (the fuel electrode of) the SOFC which is a fired body to heat treatment (hereinafter referred to as "reducing treatment") involving supplying a reducing gas at high temperature (for example, about 800° C.) to reduce NiO forming the fuel electrode to Ni. That is, it is necessary to cause (the fuel electrode of) the SOFC to be shifted from a non-reductant to a reductant.

In the case where (the fuel electrode of) the SOFC which has become the reductant by the reducing treatment is then continued to be exposed to the reducing atmosphere until the temperature of the SOFC is lowered to about 400° C. in the process of lowering the temperature of the SOFC from about 800° C. to room temperature, (the fuel electrode of) the SOFC is maintained to be the reductant even when the temperature thereof is lowered to room temperature. On the other hand, in the case where (the fuel electrode of) the SOFC is continued to be exposed to an oxidizing atmosphere until the temperature of the SOFC which has become the reductant by the reducing treatment is lowered to about 400° C., the fuel electrode is re-oxidized, and (the fuel electrode of) the SOFC can be maintained to be the non-reductant when the temperature is lowered to room temperature. That is, (the fuel electrode of) the SOFC may return from the reductant to the non-reductant. Further, (the fuel electrode of) the SOFC may be shifted from the non-reductant to the reductant again by subjecting (the fuel electrode of) the SOFC to the reducing treatment at about 800° C. again under the condition that (the fuel electrode of) the SOFC has become the non-reductant by the re-oxidation. As described above, the (produced) SOFC, which is a fired body, may have any state of the reductant and the non-reductant, depending on the later use condition.

The inventors of the present invention found that cracks are further prevented from being generated across the wall surface of the gas flow path to the principal surface when a surface roughness of the wall surface of the gas flow path is 0.16 µm to 5.2 µm in terms of an arithmetic average roughness Ra in the state in which the SOFC is the reductant, compared with the case where the surface roughness is not in that range. This point is described in detail later.

DETAILED DESCRIPTION OF THE INVENTION

First Embodiment

Figure 1:
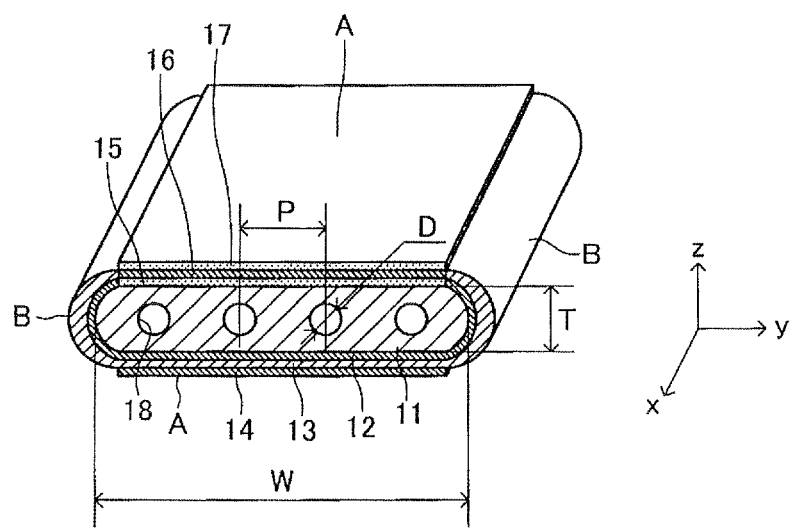
FIG. 1 is a perspective view illustrating a fuel cell according to a first embodiment of the present invention.

As illustrated in FIG. 1, in a solid oxide fuel cell (SOFC) according to a first embodiment of the present invention, a porous fuel electrode 12, a dense solid electrolyte 13, and an air electrode 14 made of porous conductive ceramics are laminated successively on one principal surface of a porous plate-like conductive support 11. Further, an intermediate film 15, an interconnector 16 made of a lanthanum-chromium based oxide material, and a current-collecting film 17 made of a P-type semiconductor material are formed successively on a principal surface of the conductive support 11 on a side opposite to the air electrode 14.

Further, in the conductive support 11, a plurality of gas flow paths 18 parallel to each other are formed along a longitudinal direction (x-axis direction) at intervals in a width direction (y-direction). A sectional shape of each gas flow path 18 is a circle having a diameter D of 0.5 mm to 3 mm. An interval (pitch) P in the width direction between the adjacent gas flow paths 18, 18 is 1 mm to 5 mm. Note that, the sectional shape of each gas flow path 18 may be an oval, an elongated hole, or a rectangle having arcs at respective four corners.

The fuel cell according to the first embodiment includes side end portions B, B respectively provided on both sides in the width direction (direction orthogonal to the longitudinal direction), and a pair of flat portions A, A connecting the side end portions B, B. The pair of flat portions A, A is flat and substantially parallel to each other. On one of the flat portions A, A, the fuel electrode 12, the solid electrolyte 13, and the air electrode 14 are formed successively on one principal surface of the conductive support 11, and on the other of the flat portions A, A, the intermediate film 15, the interconnector 16, and the current-collecting film 17 are formed successively on the other principal surface of the conductive support 11.

It is desired that a width W of the conductive support 11 be 10 mm to 100 mm, and a thickness T thereof be 1 mm to 5 mm. An aspect ratio (W/T) of the conductive support 11 is 5 to 100. A shortest distance between the principal surface of the conducive support 11 and the wall surface of the gas flow path 18 is (T−D)/2. Note that, although the shape of the conductive support 11 is expressed as a "thin-plate like" shape, the shape of the conductive support 11 can also be expressed as a "cylindroid" shape or a "flat" shape in accordance with a combination of the dimension in the width direction and the dimension in the thickness direction.

It is desired that the conductive support 11 be formed of a material containing an oxide of at least one kind of rare earth element selected from the group consisting of Y, Lu, Yb, Tm, Er, Ho, Dy, Gd, Sm, and Pr, and Ni and/or NiO as main components. The conductive support 11 may contain Fe and Cu in addition to Ni.

Alternatively, it is also possible to describe that the conductive support 11 contains "a nickel oxide (NiO) or nickel (Ni)" and "an insulating ceramics." As the insulating ceramics, there may be used, for example, calcia-stabilized zirconia (CSZ), yttria-stabilized zirconia (YSZ) (8YSZ), yttria ($Y_2O_3$), magnesium oxide (MgO), or "a mixture of magnesia-alumina spinel ($MgAl_2O_4$) and magnesium oxide (MgO)." The conductivity of the conductive support 11 at 800° C. is 10 S/cm to 2,000 S/cm. The porosity of the conductive support 11 is 20% to 60%.

The intermediate film 15 formed between the conductive support 11 and the interconnector 16 can be formed of a material containing as main components Ni and/or NiO and $ZrO_2$ containing a rare earth element, or a rare earth oxide (for example, $Y_2O_3$). An amount of the Ni compound in terms of Ni in the intermediate film 15 is desirably 35% by volume to 80% by volume, more desirably 50% by volume to 70% by volume with respect to the entire amount. When the amount in terms of Ni is 35% by volume or more, the number of conductive paths created by Ni increases to enhance a degree of conductivity of the intermediate film 15. As a result, a voltage drop attributed to the intermediate film 15 decreases. Further, when the amount in terms of Ni is 80% by volume or less, a thermal expansion coefficient difference between the conductive support 11 and the interconnector 16 can be decreased, and the generation of cracks at an interface between the conductive support 11 and the interconnector 16 can be suppressed.

Further, from the viewpoint of decreasing a voltage drop, the thickness of the intermediate film 15 is desirably 20 μm or less, more desirably 10 μm or less.

A thermal expansion coefficient of an oxide of a medium rare earth element or a heavy rare earth element is smaller than a thermal expansion coefficient of "$ZrO_2$ containing $Y_2O_3$" in the solid electrolyte 13. Thus, a thermal expansion coefficient of the conductive support 11 as a cermet material with Ni can be brought close to the thermal expansion coefficient of the solid electrolyte 13. As a result, cracks in the solid electrolyte 13 and peeling of the solid electrolyte 13 from the fuel electrode 12 can be suppressed. Further, by using a heavy rare earth element oxide having a small thermal expansion coefficient, the amount of Ni in the conductive support 11 can be increased, and the degree of electrical conductivity of the conductive support 11 can be enhanced. From this viewpoint, it is desired to use the heavy rare earth element oxide.

Note that, as long as the total thermal expansion coefficients of the rare earth element oxides is less than the thermal expansion coefficient of the solid electrolyte 13, there is no problem even when an oxide of a light rare earth element such as La, Ce, Pr, or Nd may be contained in the rare earth elements in addition to the medium rare earth element and the heavy rare earth element.

Further, a material cost can be significantly lowered through use of a composite rare earth element oxide containing a plurality of inexpensive rare earth elements that are in the middle of purification. Also in this case, it is desired that a thermal expansion coefficient of the composite rare earth element oxide be less than the thermal expansion coefficient of the solid electrolyte 13.

Further, it is desired that the current-collecting film 17 made of a P-type semiconductor, for example, a transition metal perovskite oxide, be provided on the surface of the interconnector 16. When a current-collecting member made of metal is directly formed on the surface of the interconnector 16 to collect electricity, a potential drop becomes large due to non-ohmic contact. In order to ensure ohmic contact to decrease the potential drop, it is necessary to connect the current-collecting film 17 made of a P-type semiconductor to the interconnector 16. As the P-type semiconductor, it is desired to use a transition metal perovskite oxide. As the transition metal perovskite oxide, it is desired to use at least one kind of a lanthanum-manganese oxide, a lanthanum-iron oxide, a lanthanum-cobalt oxide, and a composite oxide thereof.

The fuel electrode 12 provided on the principal surface of the conductive support 11 is formed of Ni and $ZrO_2$ in which a rare earth element is dissolved. It is desired that the thickness of the fuel electrode 12 be 1 μm to 30 μm. When the thickness of the fuel electrode 12 is 1 μm or more, a three-layer interface as the fuel electrode 12 is formed sufficiently. Further, when the thickness of the fuel electrode 12 is 30 μm or less, interface peeling caused by a thermal expansion difference between the fuel electrode 12 and the solid electrolyte 13 can be prevented.

The solid electrolyte 13 provided on the principal surface of the fuel electrode 12 is formed of yttria-stabilized zirconia (YSZ) (dense ceramics) containing yttria ($Y_2O_3$). It is desired that the thickness of the solid electrolyte 13 be 0.5 μm to 100 μm. When the thickness of the solid electrolyte 13 is 0.5 μm or more, gas permeation can be prevented. Further, when the thickness of the solid electrolyte 13 is 100 μm or less, an increase of a resistant component can be suppressed.

Further, the air electrode 14 is formed of a porous conductive ceramics including at least one kind of a lanthanum-manganese oxide, a lanthanum-iron oxide, a lanthanum-cobalt oxide, and a composite oxide thereof as a transition metal perovskite oxide. The air electrode 14 is desirably a (La, Sr)(Fe, Co)$O_3$-based electrode from the viewpoint of high electrical conductivity in a medium temperature range of about 800° C. The thickness of the air electrode 14 is desirably 10 μm to 100 μm from the viewpoint of a current collection property.

The interconnector 16 is formed as a dense body so as to prevent leakage of a fuel gas and an oxygen-containing gas inside and outside of the conductive support 11. Further, the inner and outer surfaces of the interconnector 16 come into contact with the fuel gas and the oxygen-containing gas, and hence have reduction resistance and oxidation resistance, respectively.

It is desired that the thickness of the interconnector 16 be 30 μm to 200 μm. When the thickness of the interconnector 16 is 30 μm or more, gas permeation can be prevented completely, and when the thickness of the interconnector 16 is 200 μm or less, an increase of a resistant component can be suppressed.

A joining layer made of, for example, Ni and $ZrO_2$ or $Y_2O_3$ may be interposed between an end portion of the interconnector 16 and an end portion of the solid electrolyte 13 so as to enhance a sealing property.

In the first embodiment, the dense solid electrolyte 13 is formed not only on one principal surface of the conductive support 11 but also on side end surfaces of the interconnector 16 on the other principal surface through side end portions of the conductive support 11. That is, the solid electrolyte 13 extends to the other principal surface of the conductive support 11 so as to form side end portions B, B on both sides to be joined with the interconnector 16. It is desired that the side end portions B, B (side end portions of the conductive support 11) have a curved shape protruding outward in the width direction so as to alleviate thermal stress generated by heating or cooling involved in power generation.

Next, a production method for the above-mentioned fuel cell according to the first embodiment is described. First, rare earth element oxide powder excluding elements such as La, Ce, Pr, and Nd and Ni and/or NiO powder are mixed. A conductive support material obtained by mixing an organic binder and a solvent with the mixed powder is extruded and molded to produce a plate-like conductive support compact (green body). The compact is dried and defatted.

Further, a sheet-like solid electrolyte compact is produced through use of a solid electrolyte material obtained by mixing $ZrO_2$ powder in which a rare earth element (Y) is dissolved, an organic binder, and a solvent.

Next, slurry which becomes the fuel electrode 12 and produced by mixing Ni and/or NiO powder, $ZrO_2$ powder in which a rare earth element is dissolved, an organic binder, and a solvent is applied to one side of the solid electrolyte compact (green body). Consequently, a fuel electrode compact is formed on one surface of the solid electrolyte compact.

Next, a laminate of the sheet-like solid electrolyte compact and the fuel electrode compact is wrapped around the conductive support compact so that the fuel electrode compact comes into abutment on the conductive support compact.

Next, the sheet-like solid electrolyte compact is further laminated in a plurality of layers on the solid electrolyte compact at positions forming the side end portions B, B of the laminated compact and dried. Further, the slurry which becomes the solid electrolyte 13 may be screen-printed onto the solid electrolyte compact. At this time, defatting may be performed.

Next, a sheet-like interconnector compact is produced through use of an interconnector material obtained by mixing lanthanum-chromium oxide powder, an organic binder, and a solvent.

A sheet-like intermediate film compact is produced through use of slurry obtained by mixing Ni and/or NiO powder, $ZrO_2$ powder in which a rare earth element is dissolved, an organic binder, and a solvent.

Next, the interconnector compact and the intermediate film compact are laminated. The laminate is laminated on the conductive support compact so that the intermediate film compact side of the laminate comes into abutment on the exposed conductive support compact side.

Thus, a laminated compact is produced, in which the fuel electrode compact and the solid electrolyte compact are laminated successively on one principal surface of the conductive support compact, and the intermediate film compact and the interconnector compact are laminated on the other principal surface. Each compact can be produced by sheet forming using a doctor blade, printing, slurry dipping, or spraying. Each compact can also be produced by a combination thereof.

Next, the laminated compact is defatted and co-fired in an oxygen-containing atmosphere at 1,300° C. to 1,600° C.

Next, transition metal perovskite oxide powder which is a P-type semiconductor and a solvent are mixed to produce a paste. The laminate is soaked in the paste. Then, an air electrode compact and a current-collecting film compact are respectively formed on surfaces of the solid electrolyte 13 and the interconnector 16 by dipping or direct spraying. The compacts are burned at 1,000° C. to 1,300° C. to produce the fuel cell of the present invention.

At this time, due to the firing in the oxygen-containing atmosphere, Ni components in the conductive support 11, the fuel electrode 12, and the intermediate film 15 become NiO. Thus, in order to acquire conductivity thereof, a reducing fuel gas is caused to flow from the conductive support 11 side so that NiO is reduced at 800° C. to 1,000° C. for 1 to 10 hours. The reducing treatment may be performed during power generation.

(Surface Roughness of Gas Flow Path)

As described in the section of "SUMMARY OF THE INVENTION," the state of the fuel cell (after being produced) which is a fired body can have any state of a reductant and a non-reductant, depending on the later use condition.

Figure 2:
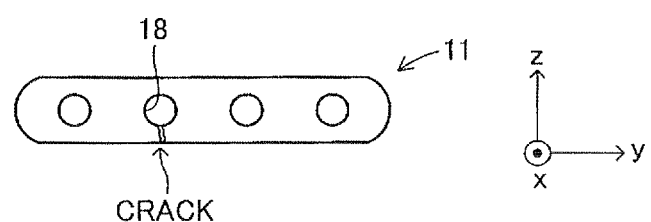
FIG. 2 is a view illustrating a crack that may be generated in a conductive support of the fuel cell illustrated in FIG. 1.

As described above, when the completed fuel cell is reduced, cracks may be generated from the wall surface of the gas flow path 18 to the principal surface in the conductive support 11 in some cases, as illustrated in FIG. 2. The inventors of the present invention found that there is a strong correlation between the generation of the cracks and the "surface roughness of the wall surface of the gas flow path" of the fuel cell in a reduced state. This is described hereinafter by way of a test A confirming this finding.

(Test A)

In the test A, regarding the fuel cell according to the first embodiment (see FIG. 1), a plurality of samples having varying combinations of the material for the conductive support 11 and the "surface roughness of the wall surface of the gas flow path" in the reduced state were produced. Specifically, as shown in Table 1, 15 kinds of levels (combinations) were prepared. 20 samples (N=20) were produced for each level. As the surface roughness, an "arithmetic average roughness Ra" defined by JIS B 0601:2001 was adopted. Values of the surface roughness shown in Table 1 are those (average value at N=20) after the completion of the fuel cell according to the first embodiment, which is a fired body, and in the stage after the reducing treatment. The surface roughness was measured in the longitudinal direction of the gas flow path 18. A surface roughness measurement instrument used in the measurement is Form Talysurf Plus manufactured by Taylor Hobson Ltd. A curvature radius of the tip of a stylus is 2 μm.

TABLE 1

| Level | Conductive support material | Surface roughness of wall surface of gas flow path (Ra) | Evaluation result |
| --- | --- | --- | --- |
| 1 | Ni—$Y_2O_3$ | 0.16 μm | ○ (No cracks) |
| 2 | Ni—$Y_2O_3$ | 0.33 μm | ○ (No cracks) |
| 3 | Ni—$Y_2O_3$ | 0.76 μm | ○ (No cracks) |
| 4 | Ni—$Y_2O_3$ | 1.2 μm | ○ (No cracks) |
| 5 | Ni—$Y_2O_3$ | 1.8 μm | ○ (No cracks) |
| 6 | Ni—$Y_2O_3$ | 2.9 μm | ○ (No cracks) |
| 7 | Ni—$Y_2O_3$ | 3.7 μm | ○ (No cracks) |
| 8 | Ni—$Y_2O_3$ | 5.2 μm | ○ (No cracks) |
| 9 | Ni—$Y_2O_3$ | 6.3 μm | x (Appearance of cracks) |
| 10 | Ni—8YSZ | 0.18 μm | ○ (No cracks) |
| 11 | Ni—8YSZ | 0.25 μm | ○ (No cracks) |
| 12 | Ni—8YSZ | 1.5 μm | ○ (No cracks) |
| 13 | Ni—8YSZ | 3.3 μm | ○ (No cracks) |
| 14 | Ni—8YSZ | 4.8 μm | ○ (No cracks) |
| 15 | Ni—8YSZ | 5.8 μm | x (Appearance of cracks) |

The conductive support 11 used in each sample (fuel cell illustrated in FIG. 1) had a material porosity of 20% to 60%, and the thickness T and the width W of 2.5 mm and 50 mm, respectively (that is, the aspect ratio W/T of 20). The gas flow path 18 had a circular sectional shape having a diameter of 1.5 mm, and the pitch P between the adjacent gas flow paths 18, 18 was 5.0 mm. In each sample, in the same way as in the above, the laminated compact (compact in which at least the fuel electrode compact and the solid electrolyte compact were laminated on the conductive support compact) was co-fired. After that, each sample was subjected to reducing treatment.

The "surface roughness of the wall surface of the gas flow path" was adjusted by adjusting the surface roughness of a mold used for extrusion molding of the conductive support compact, the particle diameter and specific surface area of the powder (rare earth element oxide powder excluding elements such as La, Ce, Pr, and Nd, Ni and/or NiO powder, etc.) used for the molding, the amount of the organic components (a binder, a pore forming material), the firing temperature, the firing time, the reducing treatment temperature, the reducing treatment time, and the like. The surface roughness of the mold can be adjusted by surface polishing, fluorine resin coating, or the like.

Specifically, the surface roughness Ra (JIS B 0601:2001) of the mold was adjusted in a range of 0.1 μm to 6.3 μm. The average particle diameter (D50) of the powder was adjusted in a range of 0.5 μm to 5 μm. More specifically, the average particle diameter (D50) of the NiO powder was adjusted in a range of 0.3 μm to 2.0 μm, the average particle diameter (D50) of the $Y_2O_3$ powder was adjusted in a range of 0.4 μm to 2.5 μm, and the average particle diameter (D50) of the 8YSZ powder was adjusted in a range of 0.5 μm to 1.8 μm. The specific surface area of the powder was adjusted in a range of 3 $m^2/g$ to 30 $m^2/g$. The amount (weight) of the organic components was adjusted in a range of 10% to 50% with respect to the total weight of the powder. As the pore forming material, cellulose, carbon, PMMA, or the like was used. The average particle diameter (D50) of the pore forming material was adjusted in a range of 0.5 μm to 30 μm. The firing temperature was adjusted in a range of 1,300° C. to 1,600° C. The firing time was adjusted in a range of 1 to 20 hours. The reducing treatment temperature was adjusted in a range of 800° C. to 1,000° C. The reducing treatment time was adjusted in a range of 1 to 10 hours.

In the test A, the porosity of the support (support substrate) was measured as follows (the same also applies to a test B described later). First, so-called "resin embedding" treatment was performed with respect to the support (support substrate) so that a resin entered pores of the support (support substrate). The surface of the support (support substrate) subjected to the "resin embedding" was mechanically polished. An image obtained by observing a microstructure of the mechanically polished surface with a scanning electron microscope was subjected to image processing to calculate respective areas of a pore portion (portion in which the resin has entered) and a non-pore portion (portion in which the resin has not entered). The ratio of the "area of the pore portion" with respect to the "total area (sum of the pore portion area and the non-pore portion area)" was defined as the "porosity" of the support (support substrate).

Then, regarding each sample in the stage (reduced state) after the reducing treatment, the presence/absence of cracks in the conductive support 11 was checked. The cracks were checked by visual observation and observation using a microscope. Table 1 shows the results.

As is understood from Table 1, when the "surface roughness of the wall surface of the gas flow path" in the reduced state becomes more than 5.2 μm in terms of the arithmetic average roughness Ra, cracks are easily generated from the wall surface of the gas flow path 18 to the principal surface in the plate-like conductive support 11, as illustrated in FIG. 2. The reason for this is considered as follows. That is, as described above, the outer periphery of the conductive support 11 in the first embodiment (see FIG. 1) is covered with a dense film (solid electrolyte 13, interconnector 16, etc.) having a gas sealing property for preventing mixing of two kinds of gasses (air and fuel). The dense film does not contract due to the reducing treatment. On the other hand, the conductive support 11 containing NiO contracts due to the reducing treatment (reduction contraction). Thus, the conductive support 11 undergoes reduction contraction while its outer periphery is bound by the dense film which does not undergo reduction contraction. On the other hand, the aspect ratio (W/T) of the conductive support 11 is very high (5 or more). Thus, the reduction contraction amount of the conductive support 11 significantly varies between the width direction and the thickness direction. Accordingly, the conductive support 11 is placed under a specific stress environment during the reducing treatment, due to the high aspect ratio thereof and the constraint of the outer periphery thereof by the dense film which does not undergo reduction contraction. At this time, a distortion generated in the conductive support 11 is concentrated on the wall surface of the gas flow path 18 serving as a free end in terms of the deformation caused by the stress. Thus, it is considered that the cracks are easily generated from the wall surface of the gas flow path 18 as an original point to the principal surface. In the case of the SOFC of a type in which the outer periphery of the plate-like support is not covered with the dense film, the "concentration of a distortion on the wall surface of the gas flow path" is easily alleviated because the support can be deformed (warped) relatively freely during the reducing treatment. That is, the support is never placed in the specific stress environment, and hence the cracks are prevented from being generated.

On the other hand, as is understood from Table 1, it can be said that when the "surface roughness of the wall surface of the gas flow path" in the reduced state is 5.2 μm or less in terms of the arithmetic average roughness Ra, the cracks are prevented from being generated.

Further, the conductive support 11 used in each sample is produced by extrusion molding of a conductive support material, as described above. In each sample, after the conductive support 11 is created (molded), surface roughness finish processing and the like of the wall surface of the gas flow path are not performed. In this state, the "surface roughness of the wall surface of the gas flow path" in the reduced state was not able to be set to less than 0.16 μm in term of the arithmetic average roughness Ra. Accordingly, it is preferred that the "surface roughness of the wall surface of the gas flow path" in the reduced state is in a range of 0.16 μm to 5.2 μm in terms of the arithmetic average roughness Ra.

In some cases, a coating film (for example, a YSZ film) is formed on the wall surface of the gas flow path of the support for the purpose of preventing re-oxidation of Ni in the support. In this case, it is preferred that the surface roughness of a "surface formed of a material for the support in an inner wall portion of the gas flow path" in the reduced state (that is, a surface covered with the coating film, not the surface of the coating film) be in a range of 0.16 μm to 5.2 μm in terms of the arithmetic average roughness Ra.

Although this result corresponds to the case where the sectional shape of each gas flow path 18 is a circle, even when the sectional shape of each gas flow path 18 is an oval, an elongated hole, or a rectangle having arcs at respective four corners, the same result is obtained, which has already been confirmed. Further, although this result corresponds to the case where the aspect ratio of the conductive support 11 is 20, as long as the aspect ratio of the conductive support 11 is in a range of 5 to 100, the same result is obtained, which has already been confirmed.

Second Embodiment

Figure 3:
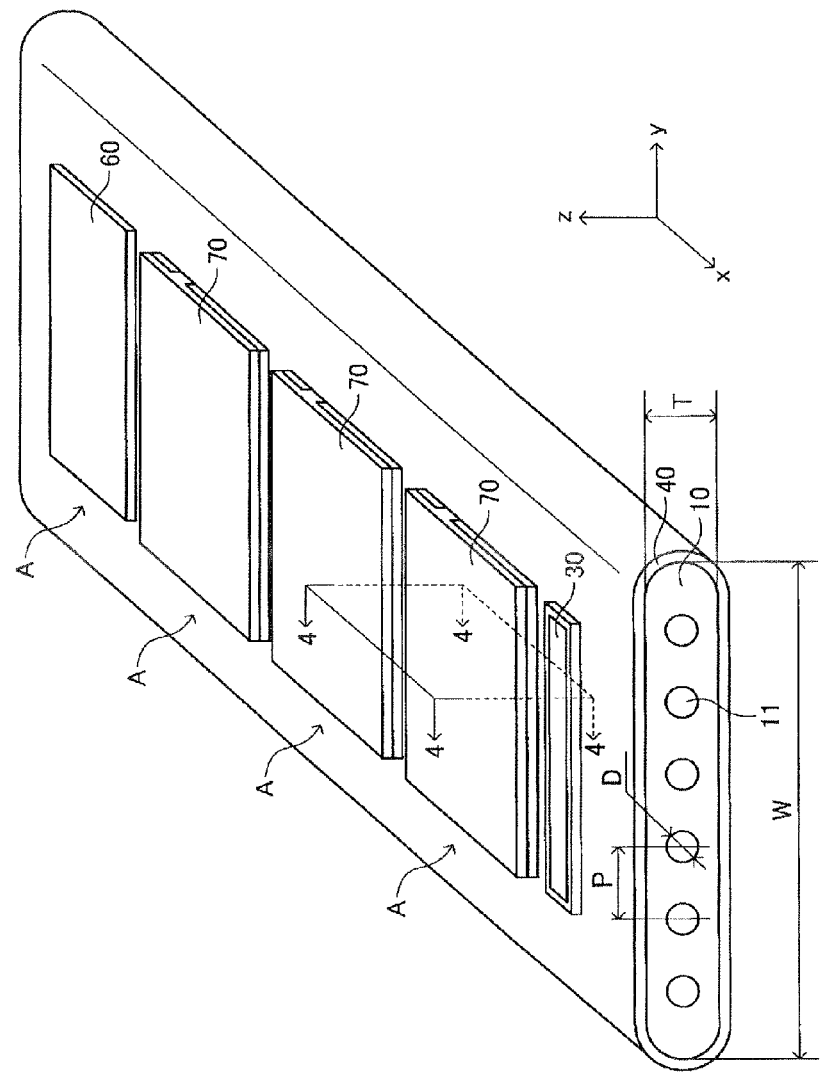
FIG. 3 is a perspective view illustrating a fuel cell according to a second embodiment of the present invention.

FIG. 3 illustrates a solid oxide fuel cell (SOFC) according to a second embodiment of the present invention. The SOFC has a so-called "horizontal-striped" construction in which a plurality of (in this embodiment, four) power generation element parts A having the same shape and electrically connected in series are arranged on respective upper and lower surfaces (principal surfaces (flat surfaces) on both sides parallel to each other) of a plate-like support substrate 10 having a longitudinal direction (x-axis direction) at predetermined intervals in the longitudinal direction.

Figure 4:
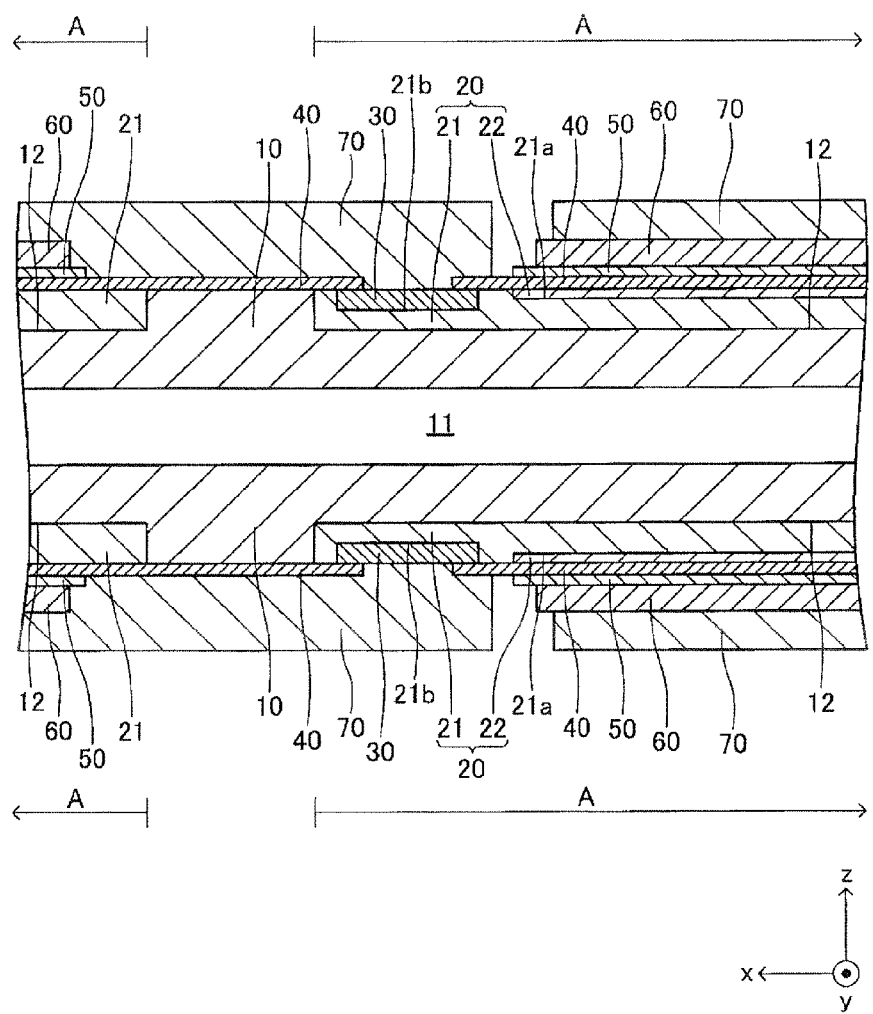
FIG. 4 is a sectional view taken along the line 4-4 of the fuel cell illustrated in FIG. 3.

The shape of the SOFC when the entire construction thereof is viewed from above is a rectangle in which, for example, a length of each side in the longitudinal direction is 5 cm to 50 cm and a length of each side in a width direction (y-axis direction) orthogonal to the longitudinal direction is 1 cm to 10 cm. The thickness of the entire SOFC is 1 mm to 5 mm. The entire SOFC has a shape vertically symmetrical with respect to a plane which passes through the center in a thickness direction and is parallel to the principal surface of the support substrate 10. In the following, the detail of the SOFC is described with reference to, in addition to FIG. 3, FIG. 4 which is a partial sectional view taken along the line 4-4 of FIG. 3 of the SOFC. FIG. 4 is a partial sectional view illustrating (part of) each construction of a typical set of adjacent power generation element parts A, A, and a construction between the power generation element parts A, A. The constructions between adjacent power generation element parts A, A of the other sets are also the same as that illustrated in FIG. 4.

Figure 8:
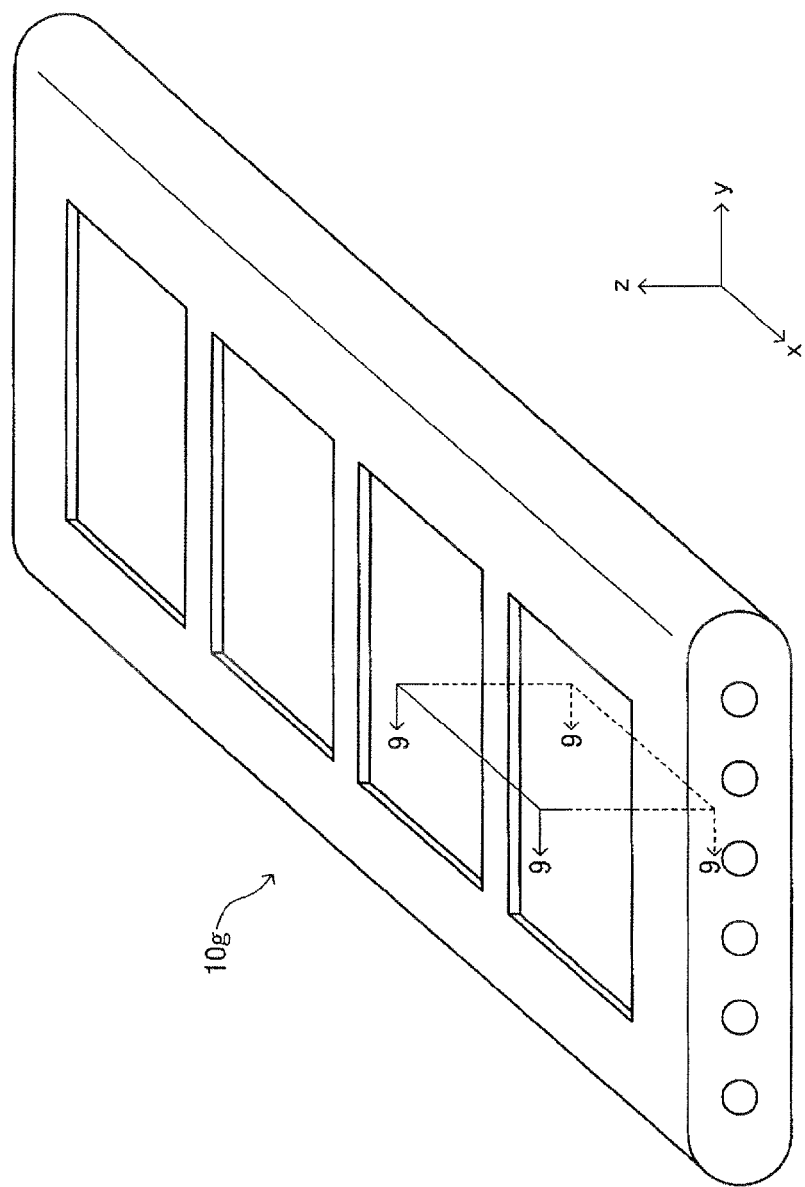
FIG. 8 is a perspective view illustrating the support substrate of FIG. 3.

The support substrate 10 is a plate-like fired body made of a porous material having no electrical conductivity. As illustrated in FIG. 8 described later, a plurality of (in this embodiment, six) fuel gas flow paths 11 (through-holes) extending in the longitudinal direction are formed in the support substrate 10 at predetermined intervals in the width direction. A sectional shape of each fuel gas flow path 11 is a circle having a diameter D of 0.5 mm to 3 mm. An interval (pitch) in the width direction of the adjacent fuel gas flow paths 11, 11 is 1 mm to 5 mm. Note that, the sectional shape of each fuel gas flow path 11 may be an oval, an elongated hole, or a rectangle having arcs at respective four corners. Further, in this embodiment, each concave portion 12 is a recess formed into a rectangular solid shape defined by a bottom wall made of a material for the support substrate 10 and side walls (two side walls in the longitudinal direction and two side walls in the width direction) closed in a circumferential direction, which are made of a material for the support substrate 10, around the entire periphery.

The support substrate 10 may be formed of, for example, calcia-stabilized zirconia (CSZ). Alternatively, the support substrate 10 may be formed of a nickel oxide (NiO) and yttria-stabilized zirconia (YSZ) (8YSZ), a nickel oxide (NiO) and yttria ($Y_2O_3$), or a magnesium oxide (MgO) and magnesia-alumina spinel ($MgAl_2O_4$). The porosity of the support substrate 10 is 20% to 60%.

The support substrate 10 may contain a "transition metal oxide or transition metal" and an insulating ceramics. As the "transition metal oxide or transition metal," a nickel oxide (NiO) or nickel (Ni) is suitable. The transition metal may function as a catalyst which enhances a reforming reaction of a fuel gas (catalyst for reforming hydrocarbon-based gas).

In addition, as the insulating ceramics, a magnesium oxide (MgO) or a "mixture of magnesia-alumina spinel ($MgAl_2O_4$) and a magnesium oxide (MgO)" is suitable. In addition, as the insulating ceramics, calcia-stabilized zirconia (CSZ), yttria-stabilized zirconia (YSZ) (8YSZ), and yttria ($Y_2O_3$) may be used.

As described above, when the support substrate 10 contains the "transition metal oxide or transition metal," in the process of supplying a gas containing an unreformed remaining gas component from the fuel gas flow path 11 to the fuel electrode through a number of pores in the porous support substrate 10, the reformation of the unreformed remaining gas component can be accelerated by the catalytic function. In addition, when the support substrate 10 contains the insulating ceramics, the insulating property of the support substrate 10 can be ensured. As a result, the insulating property between the adjacent fuel electrodes can be ensured.

A width W of the support substrate 10 is 10 mm to 100 mm, and a thickness T thereof is 1 mm to 5 mm. An aspect ratio (W/T) of the support substrate 10 is 5 to 100. A shortest distance between the principal surface of the support substrate 10 and the wall surface of the fuel gas flow path 11 is (T−D)/2. In the following, only the construction of an upper surface side of the support substrate 10 is described for simplicity of the description, considering that the shape of the structure is vertically symmetrical. The same also applies to the construction on a lower surface side of the support substrate 10.

Figure 5:
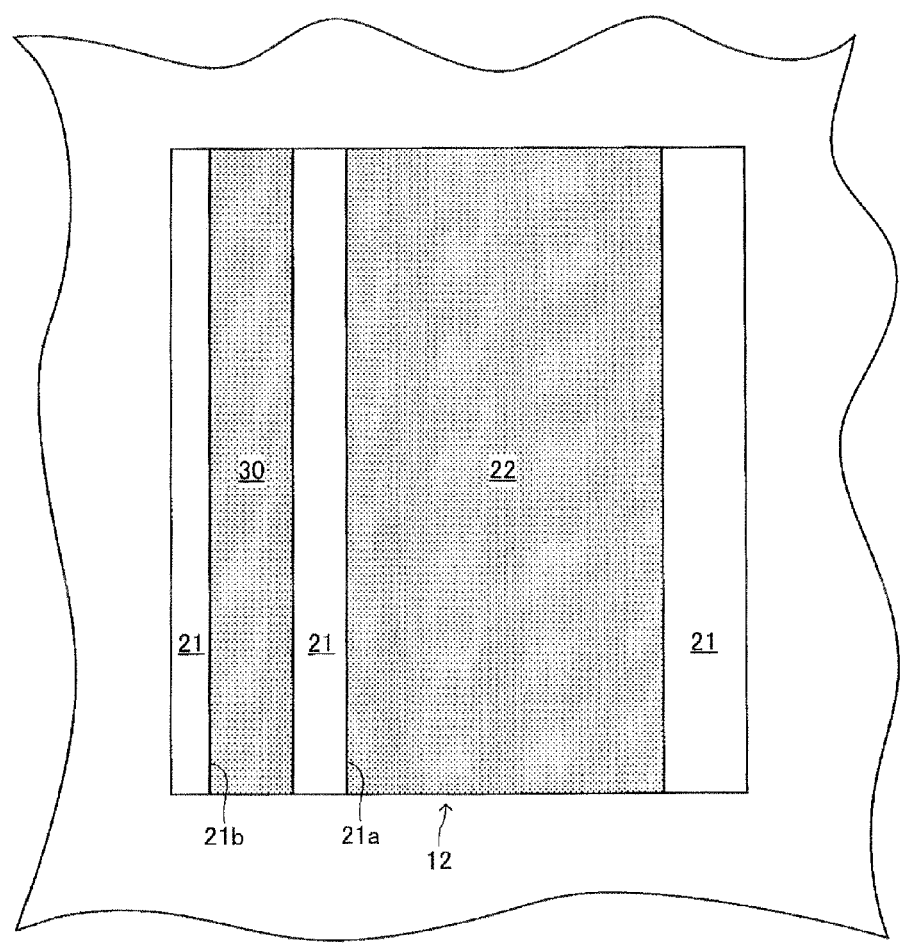
FIG. 5 is a plan view illustrating states of a fuel electrode and an interconnector buried in concave portions of a support substrate illustrated in FIG. 3.

As illustrated in FIGS. 4 and 5, in each concave portion 12 formed on the upper surface (principal surface on the upper side) of the support substrate 10, each entire fuel-electrode current-collecting portion 21 is buried (filled). Thus, each fuel-electrode current-collecting portion 21 exhibits a rectangular solid shape. A concave portion 21a is formed on the upper surface (outer surface) of each fuel-electrode current-collecting portion 21. Each concave portion 21a is a recess formed into a rectangular solid shape defined by a bottom wall made of a material for the fuel-electrode current-collecting portion 21 and side walls (two side walls in the longitudinal direction and two side walls in the width direction) closed in a circumferential direction. Of the side walls closed in the circumferential direction, the two side walls in the longitudinal direction are made of the material for the support substrate 10, and the two side walls in the width direction are made of the material for the fuel-electrode current-collecting portion 21.

In each concave portion 21a, each entire fuel-electrode active portion 22 is buried (filled). Thus, each fuel-electrode active portion 22 exhibits a rectangular solid shape. The fuel-electrode current-collecting portion 21 and the fuel-electrode active portion 22 form a fuel electrode 20. The fuel electrode 20 (fuel-electrode current-collecting portion 21 and fuel-electrode active portion 22) is a fired body made of a porous material having electron conductivity. Two side surfaces in the width direction and the bottom surface of each fuel-electrode active portion 22 are provided in contact with the fuel-electrode current-collecting portion 21 in the concave portion 21a.

In a portion excluding the concave portion 21a in the upper surface (outer surface) of each fuel-electrode current-collecting portion 21, a concave portion 21b is formed. Each concave portion 21b is a recess formed into a rectangular solid shape defined by a bottom wall made of the material for the fuel-electrode current-collecting portion 21 and side walls (two side walls in the longitudinal direction and two side walls in the width direction) closed in the circumferential direction. Of the side walls closed in the circumferential direction, the two side walls in the longitudinal direction are made of the material for the support substrate 10, and the two side walls in the width direction are made of the material for the fuel-electrode current-collecting portion 21.

In each concave portion 21b, an interconnector 30 is buried (filled). Thus, each interconnector 30 exhibits a rectangular solid shape. The interconnector 30 is a fired body made of a dense material having electron conductivity. Two side surfaces in the width direction and the bottom surface of each interconnector 30 are provided in contact with the fuel-electrode current-collecting portion 21 in the concave portion 21b.

The upper surface (outer surface) of the fuel electrode 20 (fuel-electrode current-collecting portion 21 and fuel-electrode active portion 22), the upper surface (outer surface) of the interconnector 30, and the principal surface of the support substrate 10 form one plane (plane which is the same as the principal surface of the support substrate 10 in a case where the concave portion 12 is not formed). That is, a step difference is not formed among the upper surface of the fuel electrode 20, the upper surface of the interconnector 30, and the principal surface of the support substrate 10.

The fuel-electrode active portion 22 may be formed of, for example, a nickel oxide (NiO) and yttria-stabilized zirconia (YSZ) (8YSZ). Alternatively, the fuel-electrode active portion 22 may be formed of a nickel oxide (NiO) and gadolinium doped ceria (GDC). The fuel-electrode current-collecting portion 21 may be formed of, for example, a nickel oxide (NiO) and yttria-stabilized zirconia (YSZ) (8YSZ). Alternatively, the fuel-electrode current-collecting portion 21 may be formed of a nickel oxide (NiO) and yttria ($Y_2O_3$) or a nickel oxide (NiO) and calcia-stabilized zirconia (CSZ). The thickness of the fuel-electrode active portion 22 is 5 μm to 30 μm, and the thickness of the fuel-electrode current-collecting portion 21 (that is, depth of the concave portion 12) is 50 μm to 500 μm.

Thus, the fuel-electrode current-collecting portion 21 contains a substance having electron conductivity. The fuel-electrode active portion 22 contains a substance having electron conductivity and a substance having an oxidizing ion (oxygen ion) conductivity. The "volume ratio of the substance having oxidizing ion conductivity with respect to the entire volume excluding the pore portion" in the fuel-electrode active portion 22 is larger than the "volume ratio of the substance having oxidizing ion conductivity with respect to the total volume excluding the pore portion" in the fuel-electrode current-collecting portion 21.

The interconnector 30 may be formed of, for example, lanthanum chromite ($LaCrO_3$). Alternatively, the interconnector 30 may be formed of strontium titanate (($Sr,La)TiO_3$). The thickness of the interconnector 30 is 10 μm to 100 μm.

The entire outer peripheral surface extending in the longitudinal direction of the support substrate 10 in a state in which the fuel electrode 20 and the interconnector 30 are buried in the respective concave portions 12 excluding longitudinal center portions of respective portions in which a plurality of interconnectors 30 are formed is covered with a solid electrolyte film 40. The solid electrolyte film 40 is a fired body made of a dense material having ion conductivity and having no electron conductivity. The solid electrolyte film 40 may be formed of, for example, yttria-stabilized zirconia (YSZ) (8YSZ). Alternatively, the solid electrolyte film 40 may be formed of lanthanum gallate (LSGM). The thickness of the solid electrolyte film 40 is 3 μm to 50 μm.

That is, the entire outer peripheral surface extending in the longitudinal direction of the support substrate 10 in the state in which the fuel electrode 20 is buried in each concave portion 12 is covered with a dense layer formed of the interconnector 30 and the solid electrolyte film 40. The dense layer exhibits a gas sealing function of preventing mixing of a fuel gas flowing through a space inside the dense layer and air flowing through a space outside of the dense layer.

As illustrated in FIG. 4, in this embodiment, the solid electrolyte film 40 covers the upper surface of the fuel electrode 20, both longitudinal side end portions of the upper surface of the interconnector 30, and the principal surface of the support substrate 10. In this case, as described above, there is no step difference among the upper surface of the fuel electrode 20, the upper surface of the interconnector 30, and the principal surface of the support substrate 10. Thus, the solid electrolyte film 40 is flattened. As a result, compared with the case where a step difference is formed in the solid electrolyte film 40, the generation of cracks in the solid electrolyte film 40 caused by the concentration of a stress can be suppressed, and a degradation in the gas sealing function of the solid electrode film 40 can be suppressed.

On an upper surface of the solid electrolyte film 40 at a position provided in contact with each fuel-electrode active portion 22, an air electrode 60 is formed through intermediation of a reaction preventing film 50. The reaction preventing film 50 is a fired body made of a dense material, and the air electrode 60 is a fired body made of a porous material having electron conductivity. The shapes of the reaction preventing film 50 and the air electrode 60 when viewed from above are each a rectangle substantially identical to that of the fuel-electrode active portion 22.

The reaction preventing film 50 may be formed of, for example, gadolinium doped ceria ($GDC=(Ce,Gd)O_2$). The thickness of the reaction preventing film 50 is 3 μm to 50 μm. The air electrode 60 may be formed of, for example, lanthanum strontium cobalt ferrite ($LSCF=(La,Sr)(Co,Fe)O_3$). Alternatively, the air electrode 60 may be formed of, for example, lanthanum strontium ferrite ($LSF=(La,Sr)FeO_3$), lanthanum nickel ferrite ($LNF=La(Ni,Fe)O_3$), or lanthanum strontium cobaltite ($LSC=(La,Sr)CoO_3$). In addition, the air electrode 60 may be formed by two layers including a first layer (inner layer) formed of LSCF and a second layer (outer layer) formed of LSC. The thickness of the air electrode 60 is 10 μm to 100 μm.

The reason for interposing the reaction preventing film 50 is to suppress the occurrence of a phenomenon in which YSZ in the solid electrolyte film 40 and Sr in the air electrode 60 react with each other during the production of the SOFC or in the SOFC which is being operated to form a reactive layer having a large electric resistance at an interface between the solid electrolyte film 40 and the air electrode 60.

In this case, a laminate in which the fuel electrode 20, the solid electrolyte film 40, the reaction preventing film 50, and the air electrode 60 are laminated corresponds to the "power generation element part A" (see FIG. 2). That is, a plurality of (in this embodiment, four) power generation element parts A are arranged on the upper surface of the support substrate 10 at predetermined intervals in the longitudinal direction.

In each set of the adjacent power generation element parts A, A, an air-electrode current-collecting film 70 is formed on the upper surfaces of the air electrode 60, the solid electrolyte film 40, and the interconnector 30 so as to stride across the air electrode 60 in one power generation element part A (left side in FIG. 4) and the interconnector 30 in the other power generation element part A (right side in FIG. 4). The air-electrode current-collecting film 70 is a fired body made of a porous material having electron conductivity. The shape of the air-electrode current-collecting film 70 when viewed from above is a rectangle.

The air-electrode current-collecting film 70 may be formed of, for example, lanthanum strontium cobalt ferrite ($LSCF=(La,Sr)(Co,Fe)O_3$). Alternatively, the air-electrode current-collecting film 70 may be formed of lanthanum strontium cobaltite ($LSC=(La,Sr)CoO_3$). Alternatively, the air-electrode current-collecting film 70 may be formed of silver (Ag) or a silver-palladium alloy (Ag—Pd). The thickness of the air-electrode current-collecting film 70 is 50 μm to 500 μm.

Thus, when each air-electrode current-collecting film 70 is formed, in each set of the adjacent power generation element parts A, A, the air electrode 60 in one power generation element part A (left side in FIG. 4) and the fuel electrode 20 (in particular, the fuel-electrode current-collecting portion 21) in the other power generation element part A (right side in FIG. 4) are electrically connected to each other through intermediation of the "air-electrode current-collecting film 70 and interconnector 30" having electron conductivity. As a result, a plurality of (in this embodiment, four) power generation element parts A arranged on the upper surface of the support substrate 10 are electrically connected in series. In this case, the "air-electrode current-collecting film 70 and interconnector 30" having electron conductivity correspond to a "electrical connecting portion."

The interconnector 30 corresponds to a "first portion formed of a dense material" in the "electrical connecting portion" and has a porosity of 10% or less. The air-electrode current-collecting film 70 corresponds to a "second portion formed of a porous material" in the "electrical connecting portion" and has a porosity of 20% to 60%.

Figure 6:
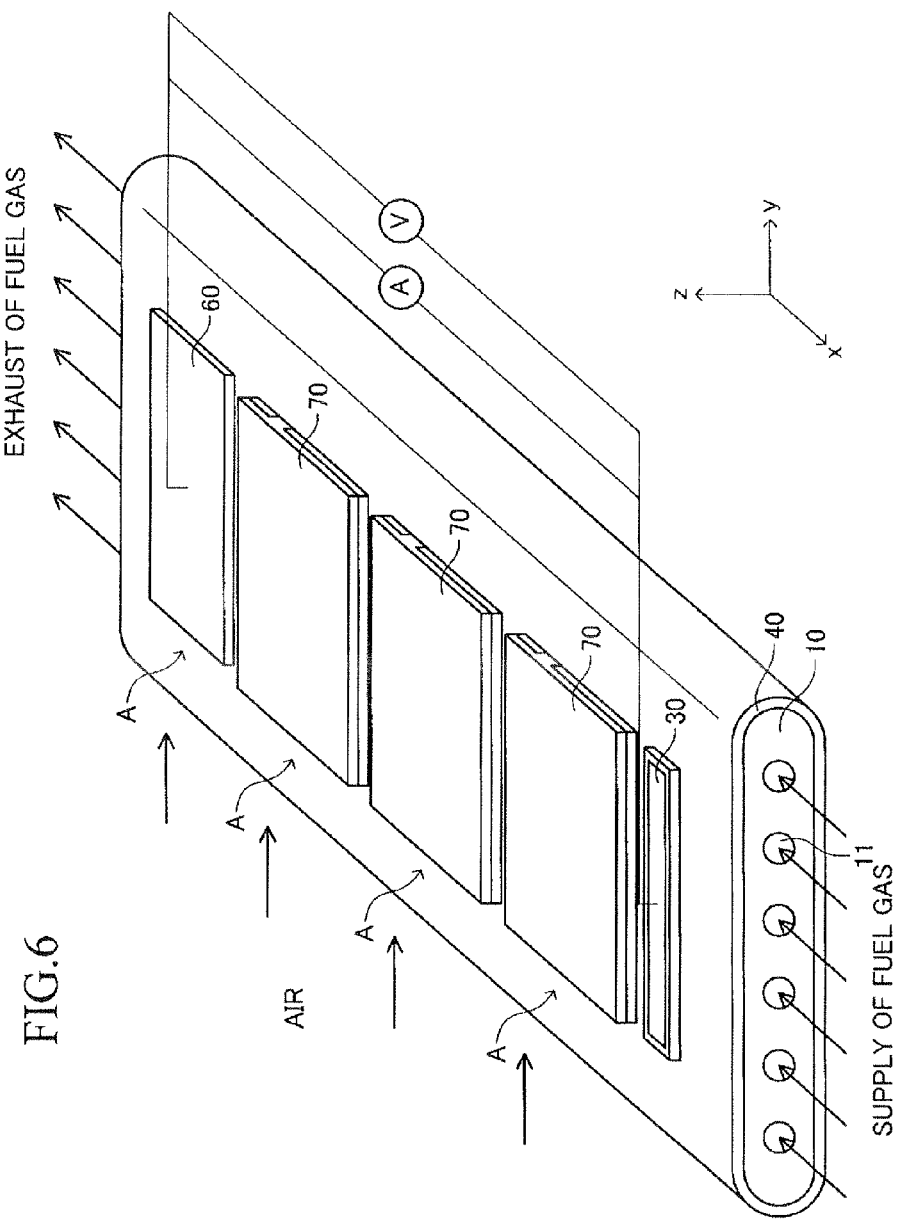
FIG. 6 is a view illustrating an operation state of the fuel cell illustrated in FIG. 3.

When a fuel gas (hydrogen gas, etc.) is allowed to flow through the fuel gas flow path 11 of the support substrate 10, and the upper and lower surfaces (in particular, each air-electrode current-collecting film 70) of the support substrate 10 are exposed to the "oxygen-containing gas" (air, etc.) (or the oxygen-containing gas is allowed to flow along the upper and lower surfaces of the support substrate 10) as illustrated in FIG. 6 with respect to the "horizontal-striped" SOFC described above, an electromotive force is generated due to an oxygen partial pressure difference caused between both side surfaces of the solid electrolyte film 40. Further, when the structure is connected to an outside load, chemical reactions represented by the following formulae (1) and (2) occur, and a current flows (power-generating state).

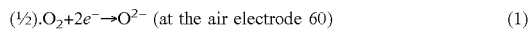
$$(\tfrac{1}{2}).O_2 + 2e^- \rightarrow O^{2-} \text{ (at the air electrode 60)} \quad (1)$$

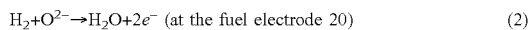
$$H_2 + O^{2-} \rightarrow H_2O + 2e^- \text{ (at the fuel electrode 20)} \quad (2)$$

Figure 7:
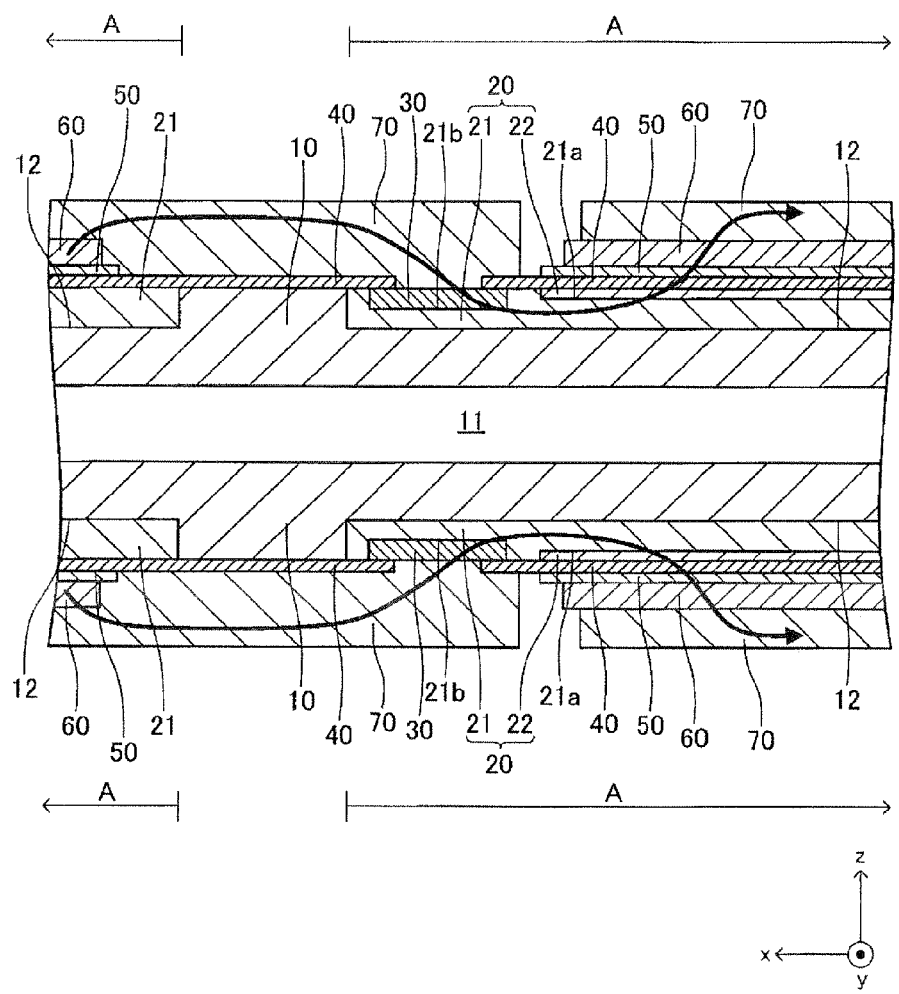
FIG. 7 is a sectional view illustrating a current flow in the operation state of the fuel cell illustrated in FIG. 3.

In the power-generating state, as illustrated in FIG. 7, a current flows as indicated by arrows in each set of the adjacent power generation element parts A, A. As a result, as illustrated in FIG. 6, electric power is taken out of the entire SOFC (specifically, through the interconnector 30 in the power generation element part A on the frontmost side and the air electrode 60 in the power generation element part A on the backmost side in FIG. 6).

(Production Method)

An example of a method of producing the "horizontal-striped" SOFC illustrated in FIG. 3 is described briefly with reference to FIGS. 8 to 16. In FIGS. 8 to 16, "g" as the suffix of a symbol of each member indicates that the member is "unfired."

First, a support substrate compact (green body) 10g having a shape illustrated in FIG. 8 is produced. The support substrate compact 10g can be produced by a procedure such as extrusion molding or cutting through use of slurry obtained by adding a binder or the like to powder of a material (for example, CSZ) of the support substrate 10. In the following, description is continued with reference to FIGS. 9 to 16 each illustrating a partial section taken along the line 9-9 of FIG. 8.

Figure 9:
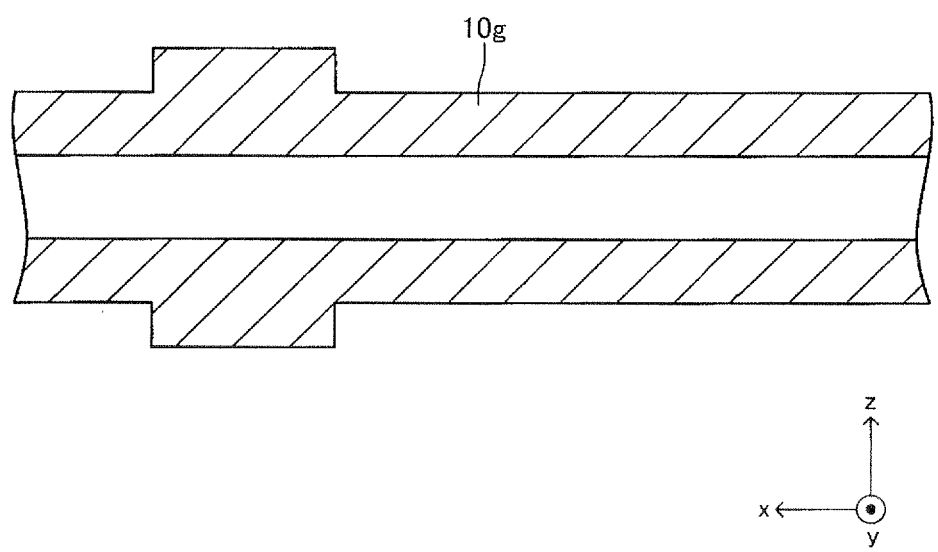
FIG. 9 is a sectional view corresponding to FIG. 4 in a first stage of a production process for the fuel cell illustrated in FIG. 3.
Figure 10:
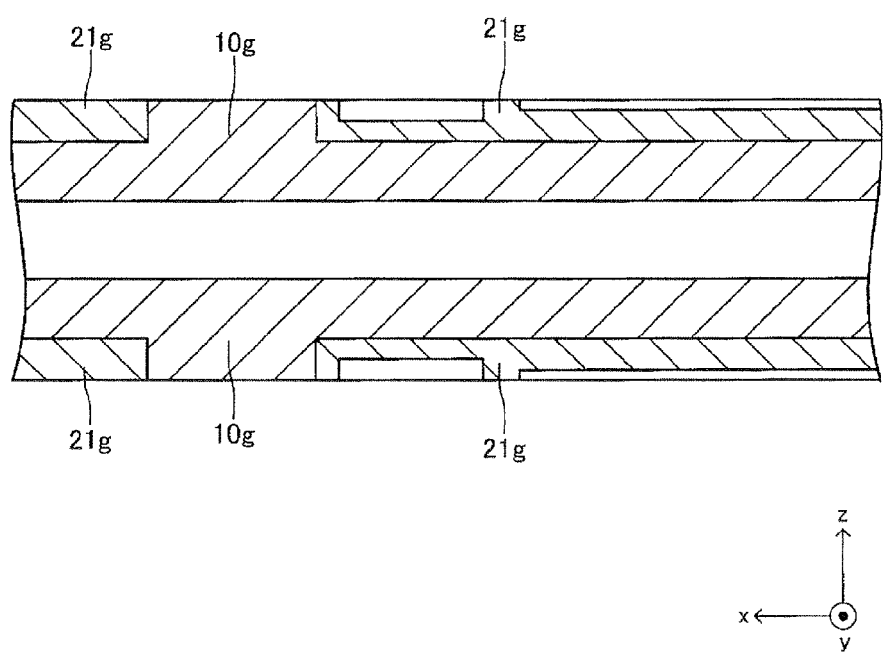
FIG. 10 is a sectional view corresponding to FIG. 4 in a second stage of the production process for the fuel cell illustrated in FIG. 3.
Figure 11:
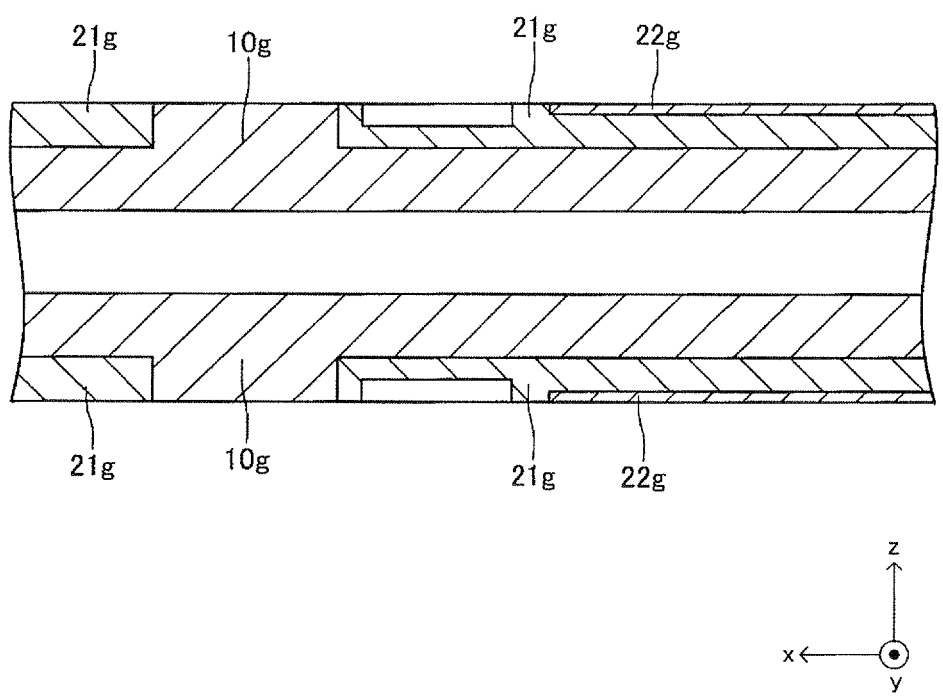
FIG. 11 is a sectional view corresponding to FIG. 4 in a third stage of the production process for the fuel cell illustrated in FIG. 3.

After the support substrate compact 10g is produced as illustrated in FIG. 9, as illustrated in FIG. 10, a fuel-electrode current-collecting portion compact 21g is buried and formed in each concave portion formed on upper and lower surfaces of the support substrate compact 10g. Then, as illustrated in FIG. 11, a fuel-electrode active portion compact 22g is buried and formed in each concave portion formed on an outer surface of each fuel-electrode current-collecting portion compact 21g. Each fuel-electrode current-collecting portion compact 21g and each fuel-electrode active portion compact 22g are buried and formed, for example, by printing or the like through use of slurry obtained by adding a binder or the like to powder of a material (for example, Ni and YSZ) of the fuel electrode 20.

Figure 12:
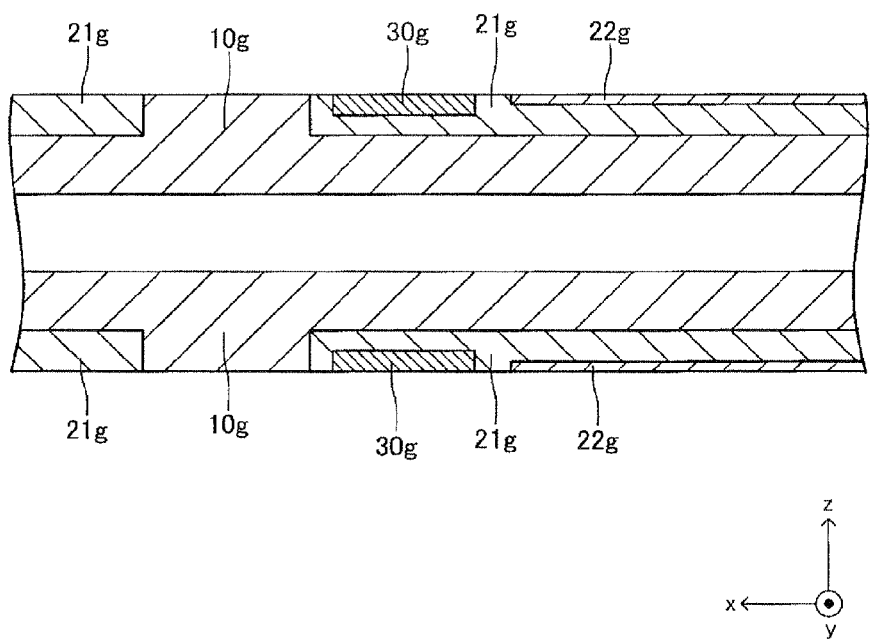
FIG. 12 is a sectional view corresponding to FIG. 4 in a fourth stage of the production process for the fuel cell illustrated in FIG. 3.

Then, as illustrated in FIG. 12, an interconnector compact 30g is buried and formed in each concave portion formed in the "portion excluding the portion where the fuel-electrode active portion compact 22g is buried" in the outer surface of each fuel-electrode current-collecting portion compact 21g. Each interconnector compact 30g is buried and formed, for example, by printing or the like through use of slurry obtained by adding a binder or the like to powder of a material (for example, LaCrO₃) of the interconnector 30.

Figure 13:
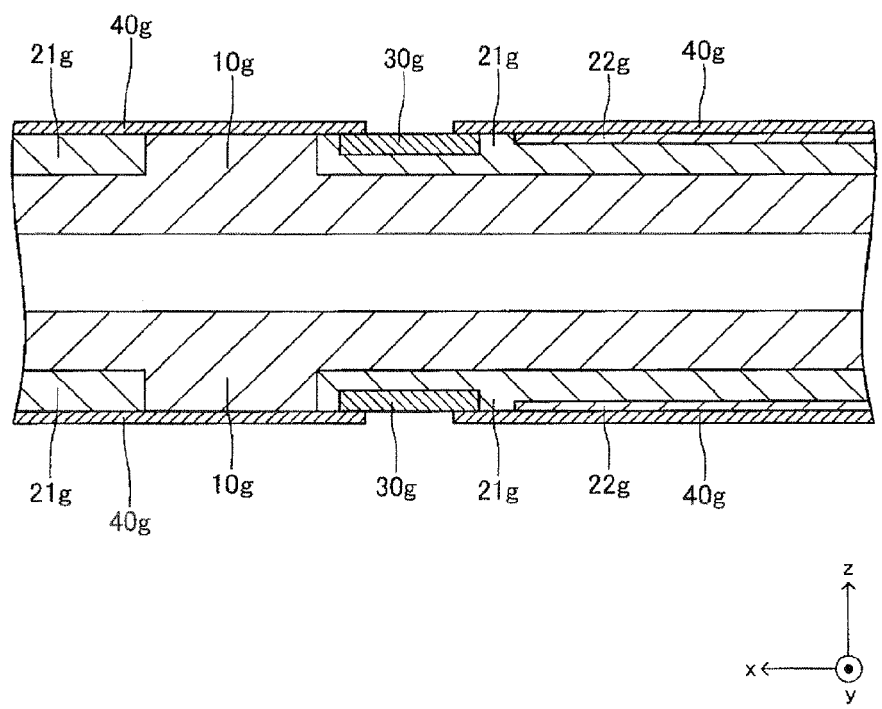
FIG. 13 is a sectional view corresponding to FIG. 4 in a fifth stage of the production process for the fuel cell illustrated in FIG. 3.

Next, as illustrated in FIG. 13, a solid electrolyte film compact 40g is formed on the entire outer peripheral surface extending in the longitudinal direction in the support substrate compact 10g in a state in which a plurality of fuel electrode compacts (21g and 22g) and a plurality of interconnector compacts 30g are respectively buried and formed excluding longitudinal center portions of the respective portions in which a plurality of interconnector compacts 30g are formed. The solid electrolyte film compact 40g is formed by printing, dipping, or the like through use of slurry obtained by adding a binder or the like to powder of a material (for example, YSZ) of the solid electrolyte film 40.

Figure 14:
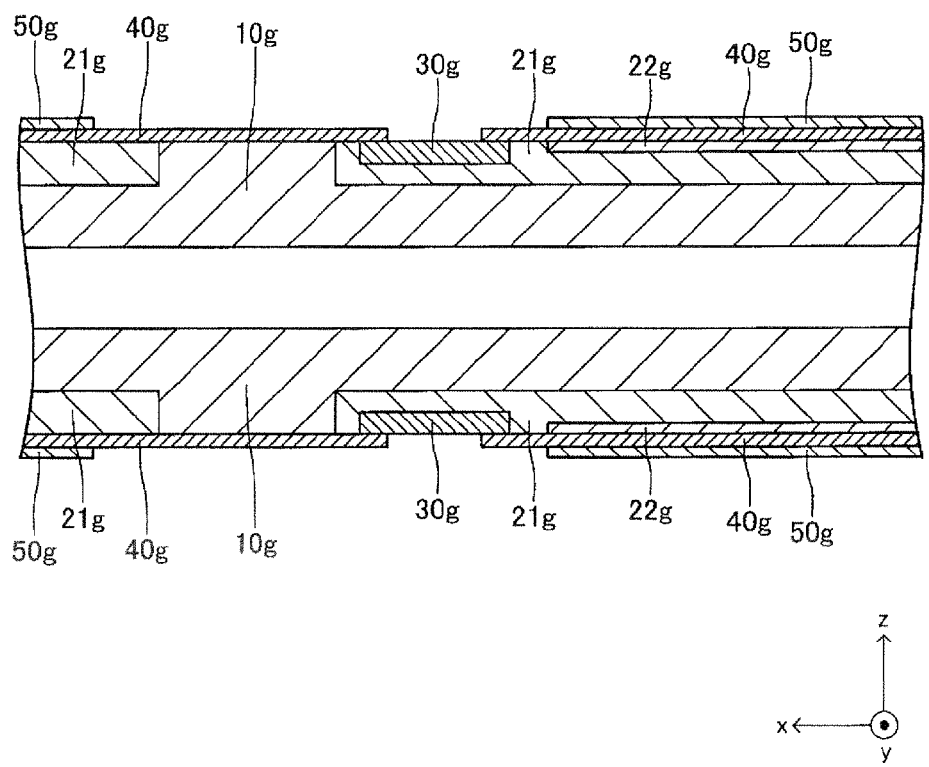
FIG. 14 is a sectional view corresponding to FIG. 4 in a sixth stage of the production process for the fuel cell illustrated in FIG. 3.

Next, as illustrated in FIG. 14, a reaction preventing film compact 50g is formed on an outer surface of the solid electrolyte film compact 40g at a position provided in contact with each fuel electrode compact 22g. Each reaction preventing film compact 50g is formed, for example, by printing or the like through use of slurry obtained by adding a binder or the like to powder of a material (for example, GDC) of the reaction preventing film 50.

Then, the support substrate compact 10g in a state in which various compacts are formed thereon as described above is fired in the air at 1,500° C. for 3 hours. As a result, a structure in a state in which the air electrode 60 and the air-electrode current-collecting film 70 are not formed in the SOFC of FIG. 3 is obtained.

Figure 15:
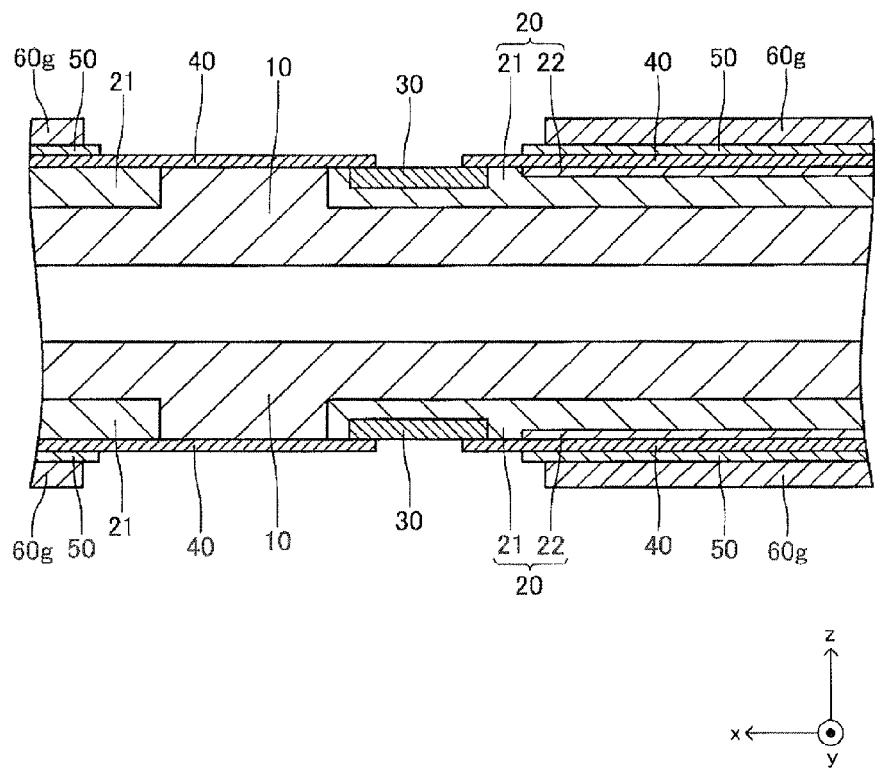
FIG. 15 is a sectional view corresponding to FIG. 4 in a seventh stage of the production process for the fuel cell illustrated in FIG. 3.

Next, as illustrated in FIG. 15, an air electrode film compact 60g is formed on an outer surface of each reaction preventing film 50. Each air electrode film compact 60g is formed, for example, by printing or the like through use of slurry obtained by adding a binder or the like to powder of a material (for example, LSCF) of the air electrode 60.

Figure 16:
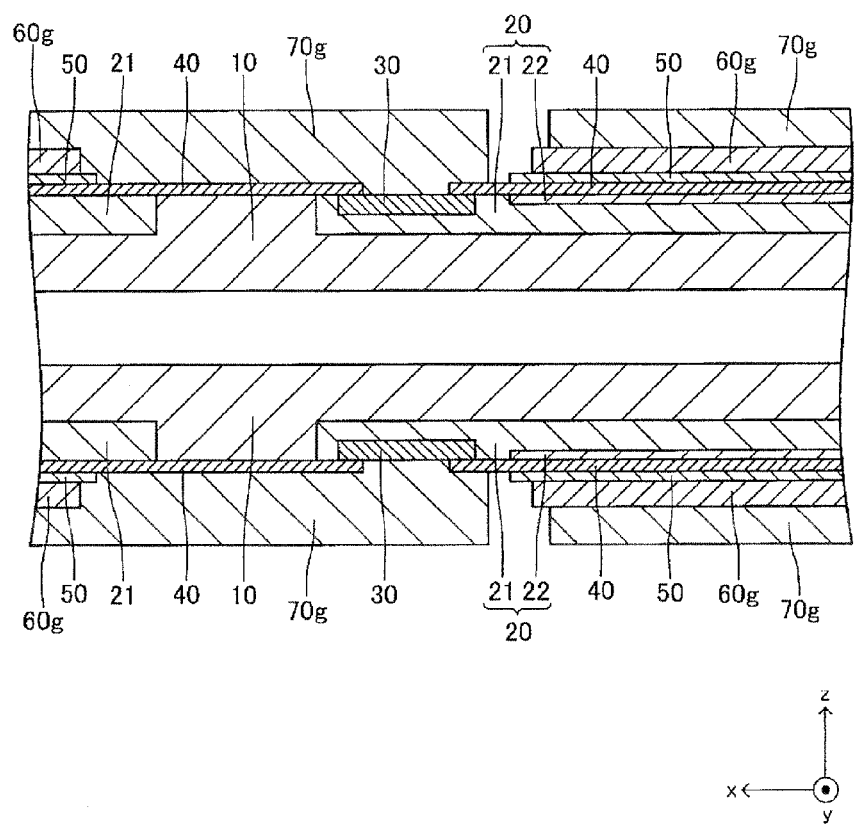
FIG. 16 is a sectional view corresponding to FIG. 4 in an eighth stage of the production process for the fuel cell illustrated in FIG. 3.

Next, as illustrated in FIG. 16, in each set of the adjacent power generation element parts, an air-electrode current-collecting film compact 70g is formed on outer surfaces of an air electrode compact 60g, the solid electrolyte film 40, and the interconnector 30 so as to stride across the air electrode compact 60g in one power generation element part and the interconnector 30 in the other power generation element part. Each air-electrode current-collecting film compact 70g is formed, for example, by printing or the like through use of slurry obtained by adding a binder or the like to powder of a material (for example, LSCF) of the air-electrode current-collecting film 70.

Then, the support substrate 10 in a state in which the compacts 60g, 70g are formed is fired in the air at 1,050° C. for 3 hours. As a result, the SOFC of FIG. 1 is obtained. The example of the method of producing the SOFC illustrated in FIG. 3 has been described.

At this time, due to the firing in the oxygen-containing atmosphere, Ni components in the support substrate 10 and the fuel electrode 20 become NiO. Thus, in order to acquire conductivity of the fuel electrode 20, a reducing fuel gas is caused to flow from the support substrate 10 side so that NiO is reduced at 800° C. to 1,000° C. for 1 to 10 hours. The reducing treatment may be performed during power generation.

(Surface Roughness of Gas Flow Path)

Figure 17:
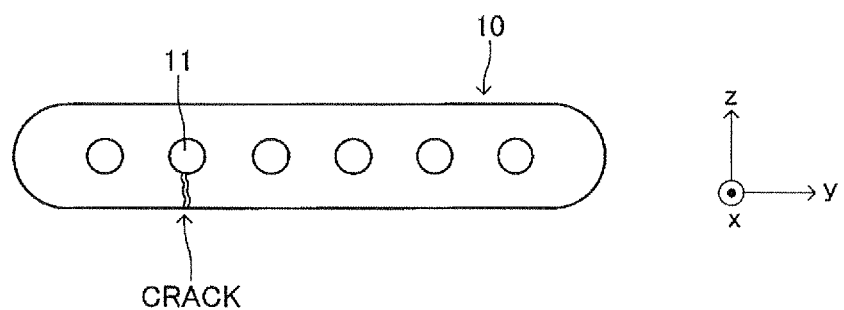
FIG. 17 is a view illustrating a crack which may be generated in the support substrate of the fuel cell illustrated in FIG. 3.

Similarly to the first embodiment described above, also in the second embodiment, when the completed fuel cell is reduced, cracks may be generated from the wall surface of the gas flow path 11 to the principal surface in the support substrate 10 in some cases, as illustrated in FIG. 17. The inventors of the present invention found that, also in the second embodiment, there is a strong correlation between the generation of the cracks and the "surface roughness of the wall surface of the gas flow path" of the fuel cell in the reduced state. This is described hereinafter by way of a test B confirming this finding.

(Test B)

In the test B, regarding the fuel cell according to the second embodiment (see FIG. 3), a plurality of samples having varying combinations of the material for the insulating support substrate 10 and the "surface roughness of the wall surface of the gas flow path" in the reduced state were produced. Specifically, as shown in Table 2, 15 kinds of levels (combinations) were prepared. 20 samples (N=20) were produced for each level. As the surface roughness, an "arithmetic average roughness Ra" defined by JIS B 0601: 2001 was adopted. Values of the surface roughness shown in Table 2 are those (average value at N=20) after the completion of the fuel cell according to the second embodiment, which is a fired body, and in the stage after the reducing treatment. The surface roughness was measured in the longitudinal direction of the fuel gas flow path 11. The surface roughness measurement instrument used in the measurement was the same as that used in the Test A.

TABLE 2

| Level | Support substrate material | Surface roughness of wall surface of gas flow path (Ra) | Evaluation result |
|---|---|---|---|
| 16 | Ni—Y$_2$O$_3$ | 0.19 μm | ○ (No cracks) |
| 17 | Ni—Y$_2$O$_3$ | 0.28 μm | ○ (No cracks) |
| 18 | Ni—Y$_2$O$_3$ | 0.63 μm | ○ (No cracks) |
| 19 | Ni—Y$_2$O$_3$ | 1.3 μm | ○ (No cracks) |
| 20 | Ni—Y$_2$O$_3$ | 2.5 μm | ○ (No cracks) |
| 21 | Ni—Y$_2$O$_3$ | 3.3 μm | ○ (No cracks) |
| 22 | Ni—Y$_2$O$_3$ | 4.9 μm | ○ (No cracks) |
| 23 | Ni—Y$_2$O$_3$ | 5.5 μm | x (Appearance of cracks) |
| 24 | Ni—8YSZ | 0.15 μm | ○ (No cracks) |
| 25 | Ni—8YSZ | 0.27 μm | ○ (No cracks) |
| 26 | Ni—8YSZ | 0.82 μm | ○ (No cracks) |
| 27 | Ni—8YSZ | 1.8 μm | ○ (No cracks) |
| 28 | Ni—8YSZ | 5.1 μm | ○ (No cracks) |
| 29 | Ni—8YSZ | 5.6 μm | x (Appearance of cracks) |
| 30 | Ni—8YSZ | 5.8 μm | x (Appearance of cracks) |

The support substrate 10 used in each sample (fuel cell illustrated in FIG. 3 had a material porosity of 20% to 60%, and the thickness T and the width W of 2.5 mm and 50 mm, respectively (that is, the aspect ratio W/T of 20). The fuel gas flow path 11 had a circular sectional shape having a diameter of 1.5 mm, and the pitch P between the adjacent fuel gas flow paths 11, 11 was 5.0 mm. In each sample, in the same way as in the above, the laminated compact (see FIG. 14) was co-fired. After that, each sample was subjected to reducing treatment.

The "surface roughness of the wall surface of the gas flow path" was adjusted by adjusting the surface roughness of a mold used for extruding molding of the support substrate compact, the particle diameter and specific surface area of the powder (powder such as CSZ) used for the molding, the amount of the organic components (a binder, a pore forming material), the firing temperature, the firing time, the reducing treatment temperature, the reducing treatment time, and the like. The surface roughness of the mold can be adjusted by surface polishing, fluorine resin coating, or the like.

Specifically, the surface roughness Ra (JIS B 0601:2001) of the mold was adjusted in a range of 0.1 μm to 6.3 μm. The average particle diameter (D50) of the powder was adjusted in a range of 0.5 μm to 5 μm. More specifically, the average particle diameter (D50) of the NiO powder was adjusted in a range of 0.3 μm to 2.0 μm, the average particle diameter (D50) of the Y$_2$O$_3$ powder was adjusted in a range of 0.4 μm to 2.5 μm, and the average particle diameter (D50) of the 8YSZ powder was adjusted in a range of 0.5 μm to 1.8 μm. The specific surface area of the powder was adjusted in a range of 3 m$^2$/g to 30 m$^2$/g. The amount (weight) of the organic components was adjusted in a range of 10% to 50% with respect to the total weight of the powder. As the pore forming material, cellulose, carbon, PMMA, or the like was used. The average particle diameter (D50) of the pore forming material was adjusted in a range of 0.5 μm to 30 μm. The firing temperature was adjusted in a range of 1,300° C. to 1,600° C. The firing time was adjusted in a range of 1 to 20 hours. The reducing treatment temperature was adjusted in a range of 800° C. to 1,000° C. The reducing treatment time was adjusted in a range of 1 to 10 hours.

Then, regarding each sample in the stage (reduced state) after the reducing treatment, the presence/absence of cracks in the insulating support substrate 10 was checked. The cracks were checked by visual observation and observation using a microscope. Table 2 shows the results.

As is understood from Table 2, when the "surface roughness of the wall surface of the gas flow path" in the reduced state becomes more than 5.1 μm in terms of the arithmetic average roughness Ra, cracks are easily generated from the wall surface of the fuel gas flow path 11 to the principal surface in the plate-like support substrate 10, as illustrated in FIG. 17. Similarly to the first embodiment described above, this is also considered to be based on the following: the aspect ratio of the support substrate 10 is high; the support substrate 10 is placed in a specific stress environment during the reducing treatment because the outer periphery of the support substrate 10 is bound by the dense film 40 which does not undergo reduction contraction; and a distortion occurring in the support substrate 10 is concentrated on the wall surface of the fuel gas flow path 11 serving as a free end.

On the other hand, as is understood from Table 2, it can be said that when the "surface roughness of the wall surface of the gas flow path" in the reduced state is 5.1 μm or less in terms of the arithmetic average roughness Ra, the cracks are prevented from being generated.

Further, the support substrate 10 used in each sample is produced by extrusion molding of a support substrate material, as described above. In each sample, after the support substrate 10 is created (molded), surface roughness finish processing and the like of the wall surface of the gas flow path are not performed. In this state, the "surface roughness of the wall surface of the gas flow path" in the reduced state was not able to be set to less than 0.15 μm in term of the arithmetic average roughness Ra. Accordingly, it is preferred that the "surface roughness of the wall surface of the gas flow path" in the reduced state is in a range of 0.15 μm to 5.1 μm in terms of the arithmetic average roughness Ra.

In some cases, a coating film (for example, a YSZ film) is formed on the wall surface of the gas flow path of the support substrate for the purpose of preventing re-oxidation of Ni in the support substrate. In this case, it is preferred that the surface roughness of a "surface formed of a material for the support substrate in an inner wall portion of the gas flow path" in the reduced state (that is, a surface covered with the coating film, not the surface of the coating film) be in a range of 0.15 µm to 5.1 µm in terms of the arithmetic average roughness Ra.

Note that, although this result corresponds to the case where the sectional shape of each fuel gas flow path 11 is a circle, even when the sectional shape of each fuel gas flow path 11 is an oval, an elongated hole, or a rectangle having arcs at respective four corners, the same result is obtained, which has already been confirmed. Further, although this result corresponds to the case where the aspect ratio of the support substrate 10 is 20, as long as the aspect ratio of the support substrate 10 is in a range of 5 to 100, the same result is obtained, which has already been confirmed.

(Function and Effects Unique to Second Embodiment)

In the second embodiment described above, each of the plurality of concave portions 12 for burying the fuel electrode 20, which are formed on the upper and lower surfaces of the support substrate 10, has side walls closed in the circumferential direction, which are made of a material for the support substrate 10 around the entire periphery. In other words, a frame surrounding each concave portion 12 is formed in the support substrate 10. Thus, this structure is less likely to be deformed when the support substrate 10 receives an external force.

Further, under a state in which members such as the fuel electrodes 20 and the interconnectors 30 are filled and buried without any gap in the respective concave portions 12 of the support substrate 10, the support substrate 10 and the buried members are co-fired. Thus, a fired body having a high joining property between the members and high reliability is obtained.

Further, the interconnector 30 is buried in the concave portion 21b formed on the outer surface of the fuel-electrode current-collecting portion 21, and as a result, the two side surfaces in the width direction (y-axis direction) and the bottom surface of the interconnector 30 in a rectangular solid shape are provided in contact with the fuel-electrode current-collecting portion 21 in the concave portion 21b. Thus, compared with the case of adopting a configuration in which the interconnector 30 in a rectangular solid shape is laminated on (is provided in contact with) an outside plane of the fuel-electrode current-collecting portion 21, an area of an interface between the fuel electrode 20 (current-collecting portion 21) and the interconnector 30 can be enlarged. This can enhance electron conductivity between the fuel electrode 20 and the interconnector 30, with the result that power generation output of the fuel cell can be enhanced.

Further, in the above-mentioned embodiment, the plurality of power generation element parts A are provided on the respective upper and lower surfaces of the plate-like support substrate 10. Thus, compared with the case where the plurality of power generation element parts are provided only on one surface of the support substrate 10, the number of the power generation element parts in the structure can be increased, and power generation output of the fuel cell can be enhanced.

Further, in the above-mentioned embodiment, the solid electrolyte film 40 covers the outer surface of the fuel electrode 20, both longitudinal side end portions of the outer surface of the interconnector 30, and the principal surface of the support substrate 10. In this case, there is no step difference among the outer surface of the fuel electrode 20, the outer surface of the interconnector 30, and the principal surface of the support substrate 10. Thus, the solid electrolyte film 40 is flattened. As a result, compared with the case where there is a step difference in the solid electrolyte film 40, the generation of cracks in the solid electrolyte film 40 caused by the concentration of stress can be suppressed, and degradation in a gas sealing function of the solid electrolyte film 40 can be suppressed.

Note that, the present invention is not limited to the above-mentioned second embodiment, and various modified examples can be adopted within the scope of the present invention. For example, in the second embodiment, as illustrated in FIG. 8 and the like, a planar shape (shape when viewed from a direction perpendicular to the principal surface of the support substrate 10) of the concave portion 12 formed in the support substrate 10 is a rectangle. However, the planar shape may be a square, a circle, an oval, an elongated hole, or the like.

Further, in the above-mentioned embodiment, although the entire interconnector 30 is buried in each concave portion 12, only a part of the interconnector 30 may be buried in each concave portion 12 and the remaining portion of the interconnector 30 may protrude outside the concave portion 12 (that is, protrude from the principal surface of the support substrate 10).

Figure 18:
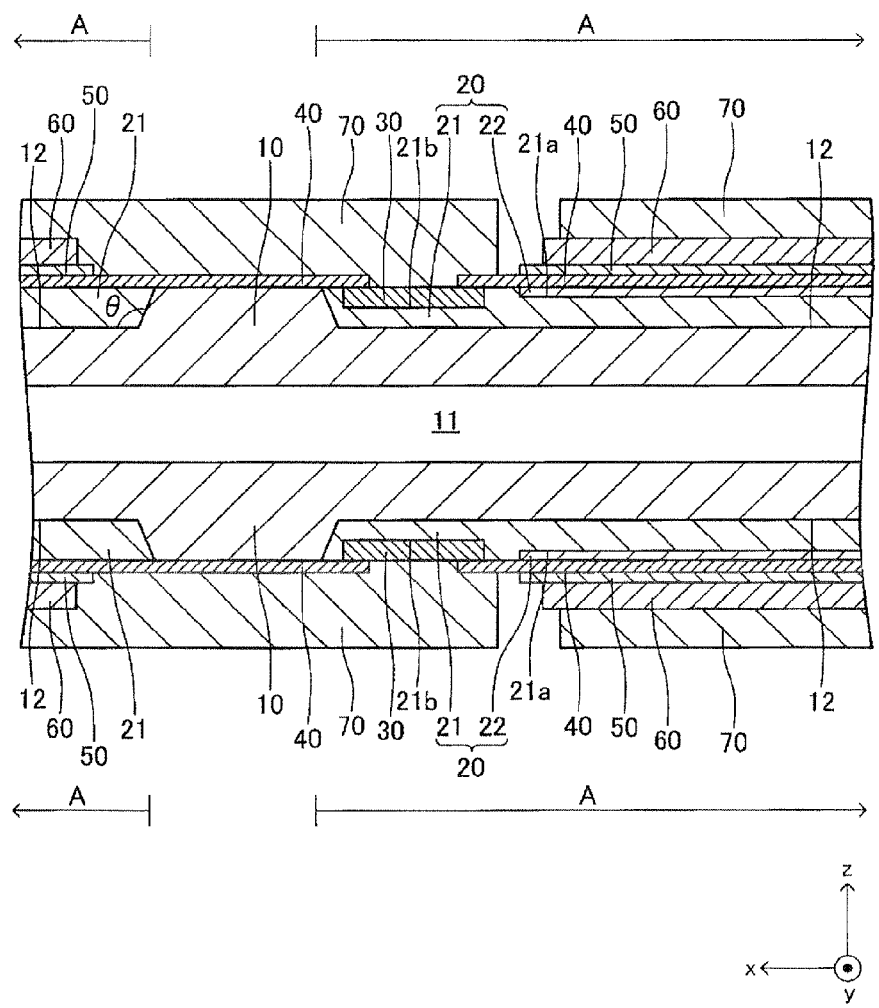
FIG. 18 is a sectional view corresponding to FIG. 4 of a fuel cell according to a first modified example of the present invention.
Figure 19:
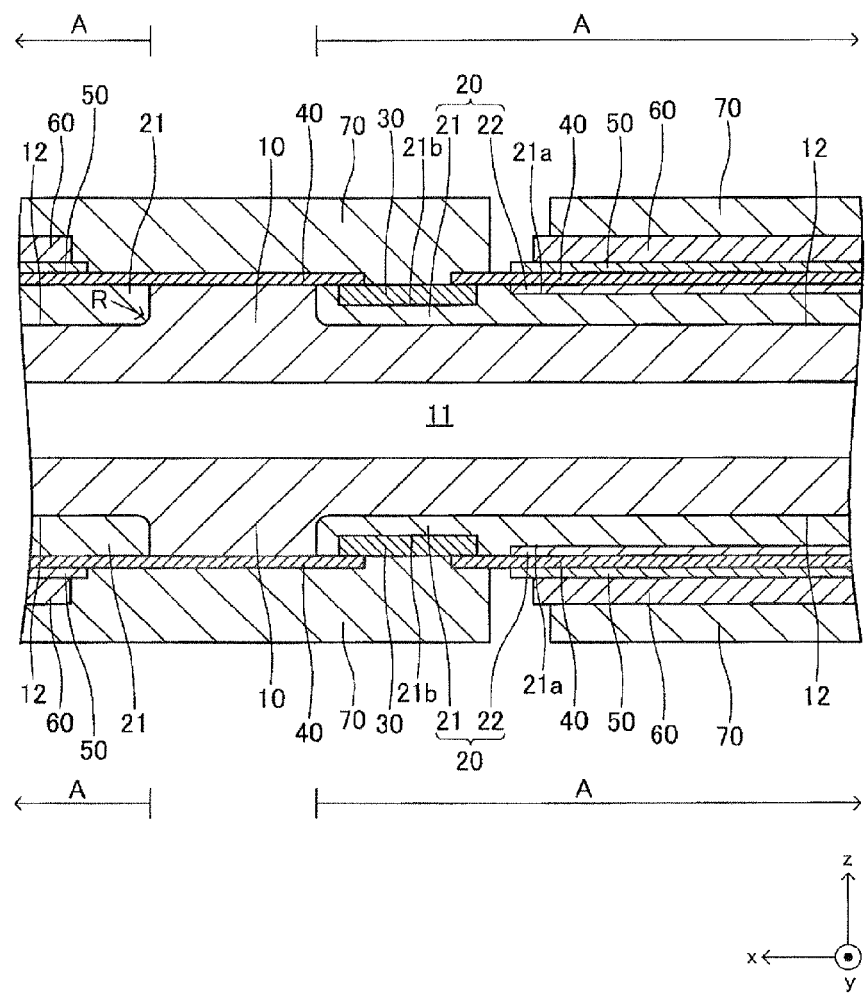
FIG. 19 is a sectional view corresponding to FIG. 4 of a fuel cell according to a second modified example of the present invention.

Further, in the above-mentioned embodiment, although an angle θ formed between the bottom wall and the side wall of the concave portion 12 is 90°, as illustrated in FIG. 18, the angle θ may be set to 90° to 135°. Further, in the above-mentioned embodiment, as illustrated in FIG. 19, a portion where the bottom wall and the side wall of the concave portion 12 intersect each other may have an arc shape with a radius R, and a ratio of the radius R with respect to the depth of the concave portion 12 may be 0.01 to 1.

Figure 20:
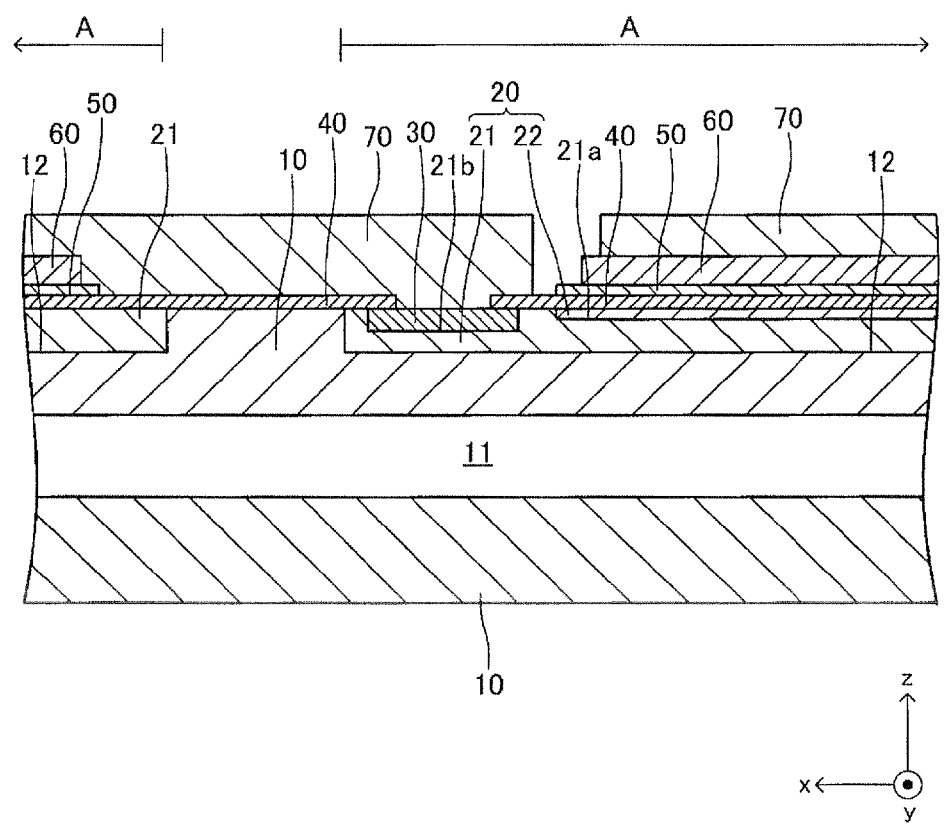
FIG. 20 is a sectional view corresponding to FIG. 4 of a fuel cell according to a third modified example of the present invention.

Further, in the above-mentioned embodiment, although the plurality of concave portions 12 are formed and the plurality of power generation element parts A are provided respectively on the upper and lower surfaces of the plate-like support substrate 10, the plurality of concave portions 12 may be formed and the plurality of power generation element parts A may be provided only on one surface of the support substrate 10, as illustrated in FIG. 20.

Further, in the above-mentioned embodiment, although the fuel electrode 20 is formed of two layers of the fuel-electrode current-collecting portion 21 and the fuel-electrode active portion 22, the fuel electrode 20 may be formed of one layer corresponding to the fuel-electrode active portion 22.

In addition, in the above-mentioned embodiment, as illustrated in FIG. 5, the concave portion 21b formed on the outer surface of the fuel-electrode current-collecting portion 21 is a recess formed into a rectangular solid shape, which is defined by the bottom wall made of the material for the fuel-electrode current-collecting portion 21 and the side walls (two side walls in the longitudinal direction made of the material for the support substrate 10 and two side walls in the width direction made of the material for the fuel-electrode current-collecting portion 21) closed in the circumferential direction. As a result, the two side surfaces in the width direction and the bottom surface of the interconnector 30 buried in the concave portion 21b are provided in contact with the fuel-electrode current-collecting portion 21 in the concave portion 21b.

Figure 21:
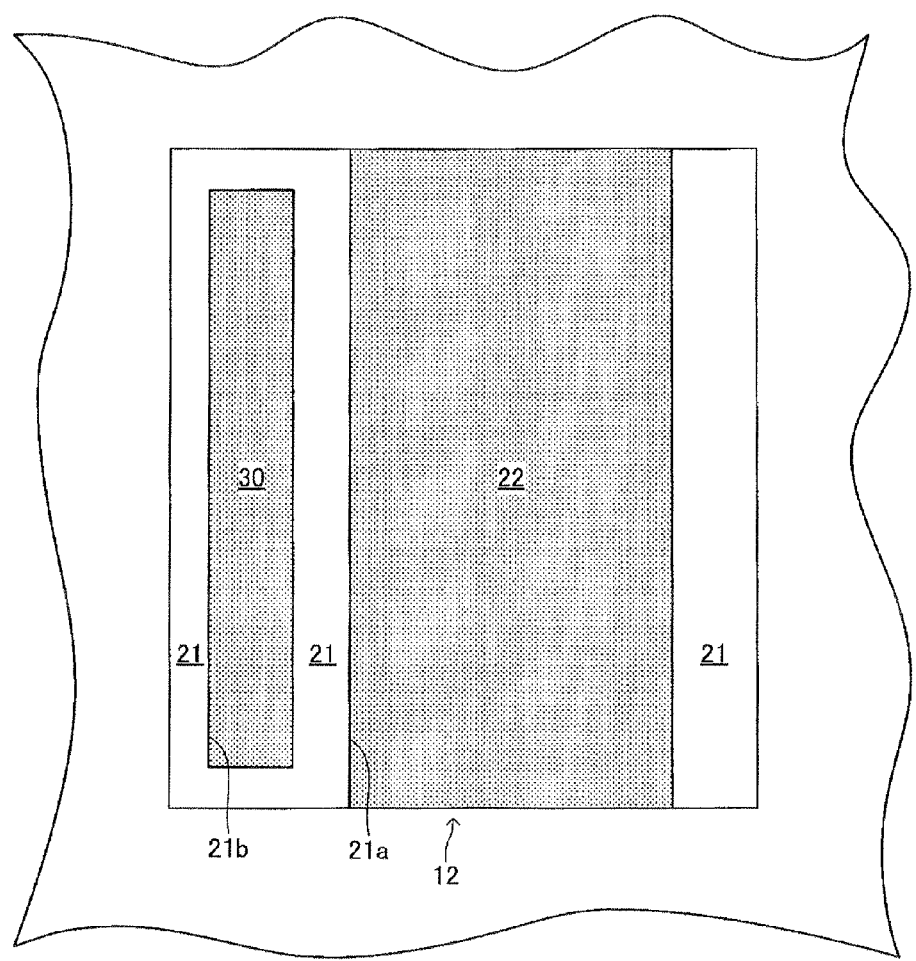
FIG. 21 is a sectional view corresponding to FIG. 5 of a fuel cell according to a fourth modified example of the present invention.

In contrast, as illustrated in FIG. 21, the concave portion 21b formed on the outer surface of the fuel-electrode current-collecting portion 21 may be a recess formed into a rectangular solid shape, which is defined by the bottom wall made of the material for the fuel-electrode current-collecting portion 21 and the side walls (two side walls in the longitudinal direction and two side walls in the width direction) closed in the circumferential direction, which are made of the material for the fuel-electrode current-collecting portion 21 around the entire periphery. According to this, all the four side surfaces and the bottom surface of the interconnector 30 buried in the concave portion 21b are provided in contact with the fuel-electrode current-collecting portion 21 in the concave portion 21b. Thus, an area of an interface between the fuel-electrode current-collecting portion 21 and the interconnector 30 can be further enlarged. This can further enhance electron conductivity between the fuel-electrode current-collecting portion 21 and the interconnector 30, with the result that power generation output of the fuel cell can be further enhanced.

Figure 22:
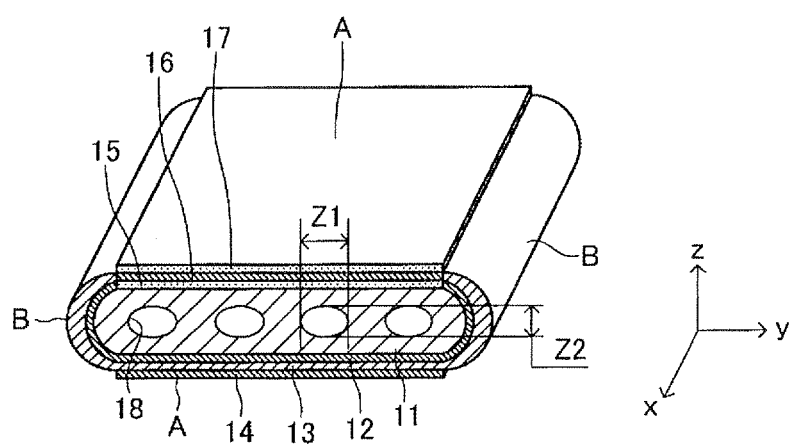
FIG. 22 is a view corresponding to FIG. 1 in the case where a sectional shape of a gas flow path in the support substrate is flat.

Further, in the above-mentioned embodiments, although the sectional shape of the gas flow path in the support (support substrate) is a circle (see FIGS. 1 and 3, etc.), the sectional shape of the gas flow path of the support (support substrate) may not be a circle as illustrated in FIG. 22. Specifically, as illustrated in FIG. 22, a ratio of a length Z1 in the width direction (y-axis direction) of the support (support substrate) with respect to a length Z2 in the thickness direction (z-axis direction) of the support (support substrate) in the sectional shape of the gas flow path may be 1.1 or more.

It has been separately found that, in the case of a gas flow path having a flat sectional shape (expanded in the width direction of the support) such that the ratio is 1.1 or more, as the ratio is larger (that is, a degree of flatness is larger), the above-mentioned cracks are easily generated. This is considered to be based on the following: as the ratio is larger (that is, a degree of flatness is larger), the above-mentioned "concentration of a distortion to the wall surface of the gas flow path" is easily occurs. Thus, as the ratio is larger (that is, a degree of flatness is larger), importance of managing the "surface roughness of the wall surface of the gas flow path" increases.

Further, in the above-mentioned embodiments, after the reducing treatment and under room temperature, the substrate (support substrate) may contain Ni but not contain NiO, or may contain both Ni and NiO.

What is claimed is:

1. A solid oxide fuel cell as a fired body, the solid oxide fuel cell comprising:
    a porous planar support substrate including a plurality of gas flow paths formed therein; and
    a power generation element part provided on a surface of the porous planar support substrate, the power generation element part including at least a fuel electrode, a solid electrolyte, and an air electrode laminated in the stated order,
    wherein the porous planar support substrate has a longitudinal direction, and the plurality of gas flow paths are through-holes formed parallel to each other at intervals in a width direction that extend in the longitudinal direction in the porous planar support substrate,
    wherein an outer periphery of the porous planar support substrate is covered with a dense film of the solid electrolyte, and
    wherein, in a state in which the fuel cell is a reductant that has been subjected to heat treatment in a reducing atmosphere, a surface roughness of a surface formed of a material for the porous planar support substrate in an inner wall portion of each of the plurality of gas flow paths is 0.16 µm to 5.2 µm in terms of an arithmetic average roughness Ra.

2. A solid oxide fuel cell according to claim 1, wherein the porous planar support substrate has a porosity of 20% to 60%.

3. A solid oxide fuel cell according to claim 1, wherein an aspect ratio that is a ratio of a width of the porous planar support substrate with respect to a thickness of the porous planar support substrate is 5 or more.

4. A solid oxide fuel cell according to claim 1, wherein the porous planar support substrate contains one of a nickel oxide (NiO) and nickel (Ni), and an insulating ceramics.

5. A solid oxide fuel cell as a fired body, the solid oxide fuel cell comprising:
    a porous planar support substrate having a plurality of gas flow paths formed therein;
    a plurality of power generation element parts respectively provided in a plurality of portions away from each other on a principal surface of the porous planar support substrate, the plurality of power generation element parts each including at least a fuel electrode, a solid electrolyte, and an air electrode laminated in the stated order; and
    at least one electrical connecting portion provided respectively between at least one set of adjacent power generation element parts, for electrically connecting the fuel electrode of one of the adjacent power generation element parts to the air electrode of another of the adjacent power generation element parts,
    wherein concave portions each having a bottom wall and a side wall closed in a circumferential direction are respectively formed in the plurality of portions on the principal surface of the porous planar support substrate,
    wherein the fuel electrode of corresponding one of the plurality of power generation element parts is buried in each of the concave portions,
    wherein the porous planar support substrate has a longitudinal direction, and the plurality of gas flow paths are through-holes formed parallel to each other at intervals in a width direction that extend in the longitudinal direction in the porous planar support substrate,
    wherein an outer periphery of the porous planar support substrate is covered with a dense film of the solid electrolyte, and
    wherein, in a state in which the fuel cell is a reductant that has been subjected to heat treatment in a reducing atmosphere, a surface roughness of a surface formed of a material for the porous planar support substrate in an inner wall portion of each of the plurality of gas flow paths is 0.15 µm to 5.1 µm in terms of an arithmetic average roughness Ra.

6. A solid oxide fuel cell as a fired body, the solid oxide fuel cell comprising:
    a porous planar support substrate having a plurality of gas flow paths formed therein;
    a plurality of power generation element parts respectively provided in a plurality of portions away from each other on a principal surface of the porous planar support substrate, the plurality of power generation element parts each including at least a fuel electrode, a solid electrolyte, and an air electrode laminated in the stated order; and
    at least one electrical connecting portion provided respectively between at least one set of adjacent power generation element parts, for electrically connecting the fuel electrode of one of the adjacent power generation element parts to the air electrode of another of the adjacent power generation element parts, wherein each of the plurality of electrical connecting portions includes a first portion made of a dense material and a second portion connected to the first portion and made of a porous material, wherein first concave portions each having a bottom wall made of a material for the porous planar support substrate and a side wall closed in a circumferential direction and made of the material for the porous planar support substrate around an entire periphery are respectively formed in the plurality of portions on the principal surface of the porous planar support substrate, wherein the fuel electrode of corresponding one of the plurality of power generation element parts is buried in each of the first concave portions, wherein second concave portions each having a bottom wall made of a material for the fuel electrode and a side wall closed in a circumferential direction and made of the material for the fuel electrode are respectively formed on outer surfaces of the buried fuel electrodes, wherein the first portion of corresponding one of the at least one electrical connecting portion is buried in each of the second concave portions, wherein the porous planar support substrate has a longitudinal direction, and the plurality of gas flow paths are through-holes formed parallel to each other at intervals in a width direction that extend in the longitudinal direction in the porous planar support substrate, wherein an outer periphery of the porous planar support substrate is covered with a dense film of the solid electrolyte, and wherein, in a state in which the fuel cell is a reductant that has been subjected to heat treatment in a reducing atmosphere, a surface roughness of a surface formed of a material for the porous planar support substrate in an inner wall portion of each of the plurality of gas flow paths is 0.15 µm to 5.1 µm in terms of an arithmetic average roughness Ra.

7. A solid oxide fuel cell according to claim 1, wherein, in a sectional shape of each of the plurality of gas flow paths, a ratio of a length in the width direction of the porous planar support substrate with respect to a length in a thickness direction of the porous plate-like support substrate is 1.1 or more.

8. A solid oxide fuel cell according to claim 1, wherein, in the state in which the fuel cell is the reductant that has been subjected to the heat treatment in the reducing atmosphere, the porous planar support substrate contains nickel (Ni) and a nickel oxide (NiO).

\* \* \* \* \*